(12) United States Patent
Shinagawa

(10) Patent No.: US 6,363,368 B2
(45) Date of Patent: *Mar. 26, 2002

(54) OPTIMUM SOLUTION SEARCH METHOD AND OPTIMUM SOLUTION SEARCH APPARATUS AS WELL AS STORAGE MEDIUM IN WHICH OPTIMUM SOLUTION SEARCH PROGRAM IS STORED

(75) Inventor: Akio Shinagawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,951

(22) Filed: Jan. 31, 1997

(30) Foreign Application Priority Data

Feb. 2, 1996 (JP) .............................. 8-017329

(51) Int. Cl.[7] .............................. G06F 15/18
(52) U.S. Cl. .......................................... 706/13
(58) Field of Search ................. 395/13, 13 F; 706/13

(56) References Cited

U.S. PATENT DOCUMENTS

| | | | |
|---|---|---|---|
| 4,881,178 A | * 11/1989 | Holland | 395/13 |
| 4,935,877 A | * 6/1990 | Koza | 364/513 |
| 4,961,152 A | * 10/1990 | Davis | 395/13 |
| 5,136,686 A | * 8/1992 | Koza | 395/13 |
| 5,140,530 A | * 8/1992 | Guha | 395/13 |
| 5,148,513 A | * 9/1992 | Koza | 364/513 |
| 5,245,696 A | * 9/1993 | Stork | 395/13 |
| 5,319,781 A | * 6/1994 | Syswerda | 395/650 |
| 5,394,509 A | * 2/1995 | Winston | 395/13 |
| 5,867,397 A | * 2/1999 | Koza et al. | 395/500.35 |
| 5,940,816 A | * 8/1999 | Fuhrer et al. | 706/13 |
| 5,946,673 A | * 8/1999 | Francone et al. | 706/13 |

OTHER PUBLICATIONS

Isao Tachikawa, "Notice of Rejection" (Foreign Office Action by Japan), Oct. 1998.*
Isao Tachikawa, "Notice of Rejection" (Foriegn Office Action by Japan), Oct. 1998.*
Microsoft Press, Computer Dictionary 332, 1997.*
John R. Koza, Genetic Programming 18, 94, 105, 1992.*
E.L. Lawler, The Traveling Salesman Problem: A Guided Tour of Combinatorial Optimization, 1985.*
Goldberg David E., Genetic Algorithms in Search, Optimization, and Machine Learning, pp. 10–18, 59–89, 120–123, 201–213, Dec. 1989.*
Maxwell III, Sidney R., Experiments with a Coroutine Execution Model for Genetic Programming, IEEE pp. 413–417, Apr. 1994.*
Parker, Joey K., Inverse Kinematics of Redundant Robots using Genetic Algorithms, IEEE pp. 271–276, 1989.*
M. Malek et al., "Serial and Parallel Simulated Annealing and Tabu Search Algorithms for the Traveling Salesman Problem"; Annals of Operation Research, vol. 21, pp. 59–84 (1989).

* cited by examiner

Primary Examiner—George B. Davis
(74) Attorney, Agent, or Firm—Staas & Halsey LLP

(57) ABSTRACT

The invention provides a technique regarding an optimal solution search method suitable for use for optimization of a system, wherein genetic algorithms can be executed at a high speed to allow an optimal solution to a problem to be searched for at a high speed. The optimal solution search method wherein candidates for solution to a problem are represented as chromosomes which are arrangements of genes and genetic operations are performed for individual chromosomes for each generation to successively update the generation to search for an optimal solution to the problem based on fitness values calculated from gene arrangements of the chromosomes.

33 Claims, 14 Drawing Sheets

FIG.6

| CHROMOSOME ID | OP₁ | OP₂ | OP₃ | ---------- | OPm |
|---|---|---|---|---|---|
| 1 | ○ | × | ○ | ---------- | ○ |
| 2 | × | × | ○ | ---------- | ○ |
| 3 | ○ | ○ | ○ | ---------- | × |
| ⋮ | ⋮ | ⋮ | ⋮ | ⋮ | ⋮ |
| n | × | ○ | × | ---------- | × |

16

○ : TO BE EXECUTED
× : NOT TO BE EXECUTED

FIG. 13

| | | OP1 | OP2 | OP3 EASY OP | OP4 | OP5 EASY OP | OP6 | OP7 EASY OP | OP8 | OP9 EASY OP | OP10 EASY OP | OP11 | OP12 |
|---|---|---|---|---|---|---|---|---|---|---|---|---|---|
| EXECUTION SCHEDULE | WHERE ONLY EASY OPs ARE INCLUDED | | | | | | | | | | | | |
| | CASE 2 | ○ | ○ | ● | ○ | ○ | ○ | ● | ○ | ● | ○ | ○ | ○ |
| FITNESS VALUE UPDATING PROCESSING | CASE 1 | | | → | → | | | → | → | | → | | → |
| | CASE 2 | | | | | | | | | | | | |
| | CASE 3 | | | | | | | | → | | | | → |

FIG. 14

| | | OP1 | OP2 | OP3 EASY OP | OP4 | OP5 EASY OP | OP6 | OP7 EASY OP | OP8 | OP9 EASY OP | OP10 EASY OP | OP11 | OP12 |
|---|---|---|---|---|---|---|---|---|---|---|---|---|---|
| EXECUTION SCHEDULE | WHERE ONLY EASY OPs ARE INCLUDED (CASE 2) | ○ | ○ | ● | ○ | ● | ○ | ● | ○ | ● | ○ | ○ | ○ |
| | WHERE UNEASY OPs ARE INCLUDED (CASE 2) | ○ | ● | ● | ● | ● | ○ | ○ | ● | ○ | ● | ● | ○ |
| | (CASE 3) | ● | ● | ● | ● | ● | ● | ● | ● | ● | ● | ● | ● |
| FITNESS VALUE CALCULATION PROCESSING | | | | | | | | | | | | | | |
| DISCRIMINATION PROCESSING OF COMPLETION OF EXECUTION OF ALL OP OF GENERATION i | | | | | | | | | | | | | | |

OPTIMUM SOLUTION SEARCH METHOD AND OPTIMUM SOLUTION SEARCH APPARATUS AS WELL AS STORAGE MEDIUM IN WHICH OPTIMUM SOLUTION SEARCH PROGRAM IS STORED

BACKGROUND OF THE INVENTION

1. Field of the Invention

This invention relates to an optimal solution search method and an optimal solution search apparatus as well as a storage medium in which an optimal solution search program is stored, suitable for use for optimization of a system using genetic algorithms (GAs), and contemplates provision of a technique for allowing genetic algorithms to be executed at a high speed to allow a high speed search for an optimal solution to a problem.

2. Description of the Related Art

In recent years, optimal solution search apparatus which search for an optimal solution to a problem using genetic algorithms have been conceived from a principle of biological evolution (selection (reproduction), mutation or crossover).

An optimal solution search apparatus which employs genetic algorithms, represents candidates for solution to a problem as chromosomes. Each chromosome is an arrangement of genes. The apparatus performs various genetic operations for the chromosomes to search for one of the optimal solutions each of which is obtained as one of the chromosomes having the highest fitness value.

It is to be noted that the fitness value is calculated from a gene arrangement of a chromosome and represents a degree of fitness to a problem. That is, a degree of quality of a solution represented by a chromosome.

An optimal solution search apparatus of the type mentioned above is typically constructed such that, at the end (or start) of a generation, a fitness value of a gene arrangement obtained as a result of the performance of genetic operations is calculated.

The optimal solution search apparatus has a problem in that, when genetic algorithms are executed, for calculation processing of fitness values is time consuming.

Particularly, when fitness values are calculated for gene arrangements obtained as a result of the performance of genetic operations (as in the optimal solution search apparatus described above)) a large amount of time is required for calculation processing of fitness values.

The optimal solution search apparatus has another problem in that, as the number of chromosomes which make an object of processing increases, or as the length of a chromosome which makes an object of processing increases, or as the calculation processing for fitness values becomes complicated, the time required for execution of genetic algorithms increases.

SUMMARY OF THE INVENTION

It is an object of the present invention to provide an optimal solution search method and apparatus wherein genetic algorithms can be executed at a high speed to allow an optimal solution to a problem to be searched for at a high speed.

It is another object of the present invention to provide a storage medium in which an improved optimal solution search program for operating a computer to search for an optimal solution is stored.

In order to attain the objects described above, according to an aspect of the present invention, there is provided an optimal solution search method wherein candidates for solution to a problem are represented as chromosomes, which are arrangements of genes and genetic operations, and are performed for individual chromosomes for each generation to successively update the generation to search for an optimal solution to the problem based on fitness values calculated from gene arrangements of the chromosomes, the optimal solution search method comprising the fitness value updating step of updating, for each of those chromosomes for which a particular genetic operation which allows a fitness value after execution thereof to be calculated readily making use of a fitness value before the execution thereof, and the fitness value based on variation information of the fitness value by execution of the particular genetic operation.

The optimal solution search method according to the present invention is advantageous in that, since the time required for calculation processing of fitness values can be reduced, genetic algorithms can be executed at a high speed and an optimal solution to a problem can be searched at a high speed.

According to another aspect of the present invention, there is provided an optimal solution search method wherein candidates for solution to a problem are represented as chromosomes, which are arrangements of genes and genetic operations, and are performed for individual chromosomes for each generation to successively update the generation to search for an optimal solution to the problem based on fitness values calculated from gene arrangements of the chromosomes, the optimal solution search method comprising the schedule determination step of determining, prior to execution of those genetic operations which remain before the end of a generation, an execution schedule of the genetic operations to be performed for each of the chromosomes, the chromosome discrimination step of referring to the execution schedules determined by the schedule determination step to discriminate, for each of the chromosomes, whether or not the chromosome is a particular chromosome for which only a particular genetic operation which allows a fitness value after execution thereof to be calculated readily making use of a fitness value before the execution thereof, and the fitness value updating step of updating, for each of those chromosomes which have been determined to be the particular chromosomes by the chromosome discrimination step, and the fitness value based on variation information of the fitness value by execution of the particular genetic operation.

In another aspect of the present invention, the fitness value updating step, the fitness values may be updated in synchronism with execution of the particular genetic operation.

In another aspect of the present invention, the fitness value updating step, upon execution of the particular genetic operation, variation information of the fitness value may be calculated by execution of the particular genetic operation.

In another aspect of the present invention, the fitness value updating step, upon execution of the particular genetic operation from among those genetic operations which make an object of determination in the schedule determination step, variation information of the fitness value may be calculated by execution of the particular genetic operation independently of a result of the discrimination in the chromosome discrimination step.

In another aspect of the present invention, in the fitness value updating step, variation information of the fitness value may be calculated by execution of the particular genetic operation after execution of an arbitrary one of those genetic operations which make an object of determination in the schedule determination step.

Upon execution of the particular genetic operation from among those genetic operations executed prior to one of the genetic operations which has been determined as an object of determination in the schedule determination step, variation information of the fitness value by execution of the particular genetic operation may be calculated.

In the schedule determination step, it is only required that the execution schedules be determined before the particular genetic operation appearing last is executed.

In another aspect of the present invention, in the schedule determination step, the execution schedules may be determined before the first genetic operation is executed, or before the particular genetic operation appearing first is executed, or before an arbitrary genetic operation is executed.

In another aspect of the present invention, in the schedule determination step, the execution schedules of genetic operations may be determined for the individual chromosomes, or an execution schedule of genetic operations which is common to all of the chromosomes may be determined.

In another aspect of the present invention, in the chromosome discrimination step, the execution schedules determined by the schedule determination step and also execution conditions of those genetic operations which have been executed prior to a genetic operation determined as an object of determination by the schedule determination step may be referred to to discriminate, for each of the chromosomes, whether or not the chromosome is a chromosome for which only the particular genetic operation should be performed.

In another aspect of the present invention, in the chromosome discrimination step, for each of the chromosomes, whether or not the chromosome is a chromosome for which the particular genetic operation should be performed may be discriminated before the particular genetic operation which appears last is executed.

In this instance, in the chromosome discrimination step, for each of the chromosomes, whether or not the chromosome is a chromosome for which the particular genetic operation should be performed may be discriminated before the first genetic operation is executed, or before the particular genetic operation which appears first is executed, or after an arbitrary genetic operation is executed.

In another aspect of the present invention, in the chromosome discrimination step, for each of the chromosomes, whether or not the chromosome is a chromosome for which only the particular genetic operation should be performed may be discriminated before the fitness value is updated by the fitness value updating step after the last genetic operation is executed.

With the optimal solution search method of the present invention, for each particular chromosome for which only the particular genetic operation which allows a fitness value after execution thereof to be calculated readily making use of a fitness value before the execution thereof, the fitness value is updated based on variation information of the fitness value by execution of the particular genetic operation. Consequently, the time required for calculation processing of fitness values can be reduced. Accordingly, the optimal solution search method is advantageous in that genetic algorithms can be executed at a high speed and an optimal solution to a problem can be searched at a high speed.

According to a further aspect of the present invention, there is provided an optimal solution search apparatus wherein candidates for solution to a problem are represented as chromosomes which are arrangements of genes and genetic operations are performed for individual chromosomes for each generation to successively update the generation to search for an optimal solution to the problem based on fitness values calculated from gene arrangements of the chromosomes, the optimal solution search apparatus comprising schedule determination means for determining, prior to execution of those genetic operations which remain before the end of a generation, an execution schedule of the genetic operations to be performed for each of the chromosomes, chromosome discrimination means for referring to the execution schedules determined by the schedule determination means to discriminate, for each of the chromosomes, whether or not the chromosome is a particular chromosome for which only a particular genetic operation which allows a fitness value after execution thereof to be calculated readily making use of a fitness value before the execution thereof, and fitness value updating means for updating, for each of those chromosomes which have been determined to be the particular chromosomes by the chromosome discrimination means, the fitness value based on variation information of the fitness value by execution of the particular genetic operation.

The schedule determination means may include a table for storing the execution schedules.

The chromosome discrimination means may include a table for storing information representing whether or not genetic operations to be performed for the individual chromosomes are the particular genetic operation, and another table for storing information representing whether or not the individual chromosomes are chromosomes for which only the particular genetic operation should be performed.

The optimal solution search apparatus of the present invention may further comprise updating pre-processing means for calculating, when the particular genetic operation from among those genetic operations executed prior to a genetic operation determined as an object of determination by the schedule determination means, variation information of the fitness value by execution of the particular genetic operation.

In another aspect of the present invention, the optimal solution search apparatus of the present invention may further comprise fitness value calculation means for calculating, for each of those chromosomes which have not been discriminated to be the particular chromosome by the chromosome discrimination means, a fitness value from a gene arrangement of the chromosome.

In another aspect of the present invention, the optimal solution search apparatus of the present invention may further comprise genetic operation execution means for performing the genetic operations for the individual chromosomes.

In another aspect of the present invention, the optimal solution search apparatus of the present invention may further comprise optimal solution discrimination means for discriminating an optimal solution to the problem based on the fitness value obtained by the fitness value updating means and the fitness value calculation means.

In another aspect of the present invention, the optimal solution search apparatus of the present invention may further comprise chromosome production means for representing candidates for solution to the problem as chromosomes which are arrangements of genes.

With the optimal solution search apparatus of the present invention, for each particular chromosome for which only the particular genetic operation which allows a fitness value after execution thereof to be calculated readily making use of a fitness value before the execution thereof, the fitness value is updated based on variation information of the fitness value by execution of the particular genetic operation. Consequently, the time required for calculation processing of fitness values can be reduced. Accordingly, the optimal solution search apparatus is advantageous in that genetic algorithms can be executed at a high speed and an optimal solution to a problem can be searched at a high speed.

According to a still further aspect of the present invention, there is provided a storage medium which stores an optimal solution search program for causing a computer to operate so that candidates for solution to a problem are represented as chromosomes which are arrangements of genes and genetic operations are performed for individual chromosomes for each generation to successively update the generation to search for an optimal solution to the problem based on fitness values calculated from gene arrangements of the chromosomes, wherein the optimal solution search program causes the computer to function as schedule determination means for determining, prior to execution of those genetic operations which remain before the end of a generation, an execution schedule of the genetic operations to be performed for each of the chromosomes, chromosome discrimination means for referring to the execution schedules determined by the schedule determination means to discriminate, for each of the chromosomes, whether or not the chromosome is a particular chromosome for which only a particular genetic operation which allows a fitness value after execution thereof to be calculated readily making use of a fitness value before the execution thereof, and fitness value updating means for updating, for each of those chromosomes which have been determined to be the particular chromosomes by the chromosome discrimination means, the fitness value based on variation information of the fitness value by execution of the particular genetic operation.

With the storage medium which stores the optimal solution search program of the present invention, for each particular chromosome for which the particular genetic operation which allows a fitness value after execution thereof to be calculated readily making use of a fitness value before the execution thereof, the fitness value is updated based on variation information of the fitness value by execution of the particular genetic operation. Consequently, the time required for calculation processing of fitness values can be reduced. Accordingly, the storage medium which stores the optimal solution search program is advantageous in that genetic algorithms can be executed at a high speed and an optimal solution to a problem can be searched at a high speed.

BRIEF DESCRIPTION OF THE DRAWINGS

FIG. 6 is a table illustrating an example of an execution schedule produced by a schedule determination section.

FIGS. 12 to 14 are diagrammatic views illustrating execution timings of various processes by a genetic algorithm execution section.

DESCRIPTION OF THE PREFERRED EMBODIMENT a. Embodiment of the Invention

An embodiment of the present invention will be described below with reference to the drawings.

Figure 1:
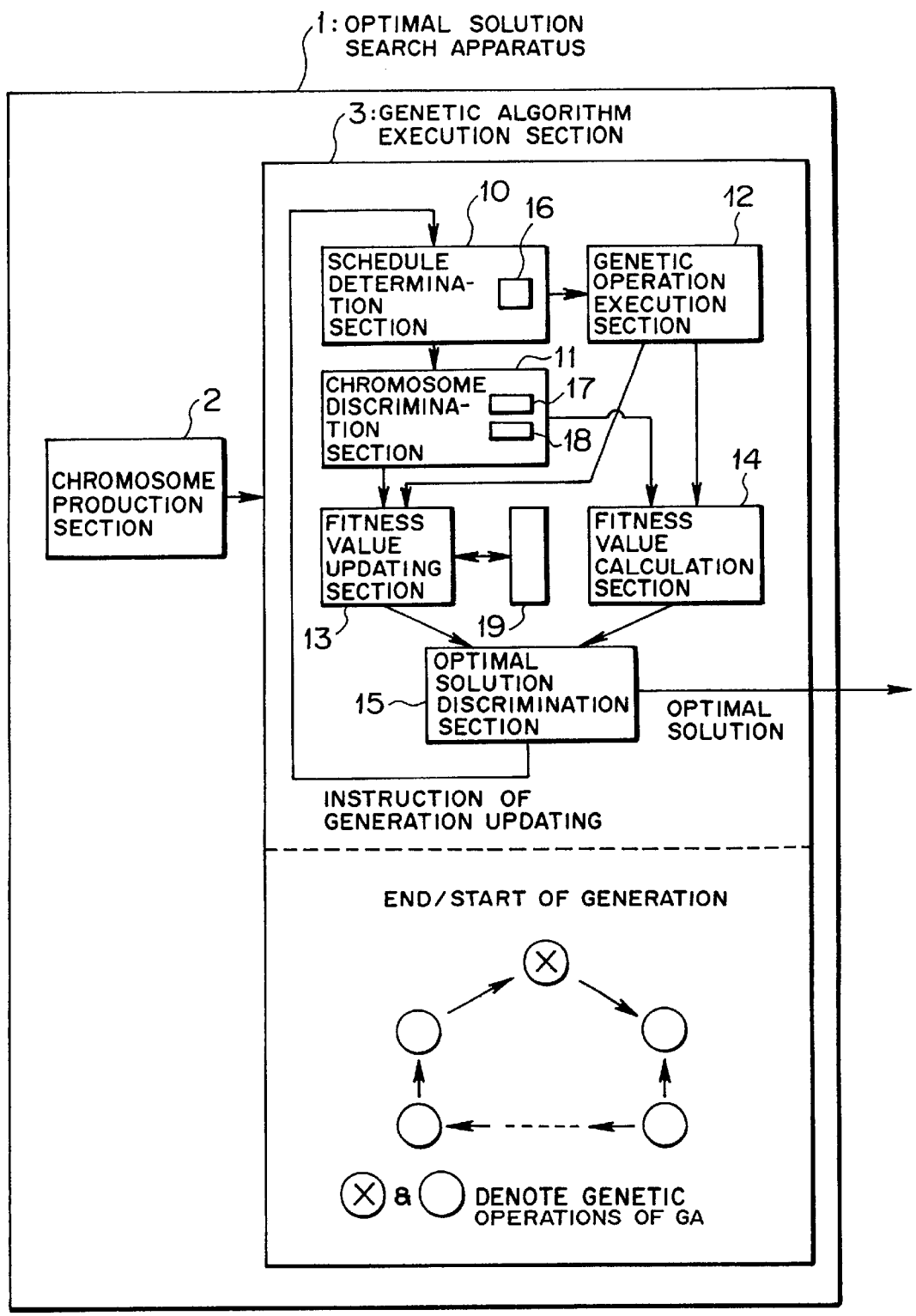
FIG. 1 is a block diagram showing a functional construction of an optimal solution search apparatus according to a preferred embodiment of the present invention.

Referring first to FIG. 1, there is shown in block diagram a functional construction of an optimal solution search apparatus according to a preferred embodiment of the present invention.

The optimal solution search apparatus shown is generally denoted at 1 and includes a chromosome production section 2 and a genetic algorithm execution section 3. The optimal solution search apparatus 1 represents candidates for solution to a problem as chromosomes "j" (j=1 to n) which are arrangements of genes, and performs genetic operations $OP_k$ (k=1 to m) for the chromosomes "j" for each generation to successively update the generation to search for an optimal solution to the problem based on fitness values $f_j'$ calculated from gene arrangements of chromosomes "j".

Here, prior to description of the optimal solution search apparatus 1 according to the present embodiment, several terms used in the description of the embodiment are explained.

The genetic algorithms (GAs) are algorithms conceived from a principle of biological evolution (selection (reproduction), mutation or crossover) and can be considered as a technique for probabilistic search, learning and optimization.

The chromosome exists as a substance which conveys genetic information. The chromosome is, in an actual organism, a physical substance composed of bases, but in genetic algorithms, a data area or a data array in the form of a code of candidates for solution to a problem. It is to be noted that a set of data represented by a data area or a data array is called individual, and components of a data area or a data array are called genes.

Further, the fitness values are values calculated from a gene arrangement of chromosomes and represent degrees of fitness to a problem, that is, degrees of quality of solutions represented by chromosomes as described hereinabove. It is to be noted that the fitness values are calculated using a fitness function. Further, since the fitness values are used when selection from among genetic operations which will be hereinafter described is performed, it must be calculated prior to such selection.

Figure 4:
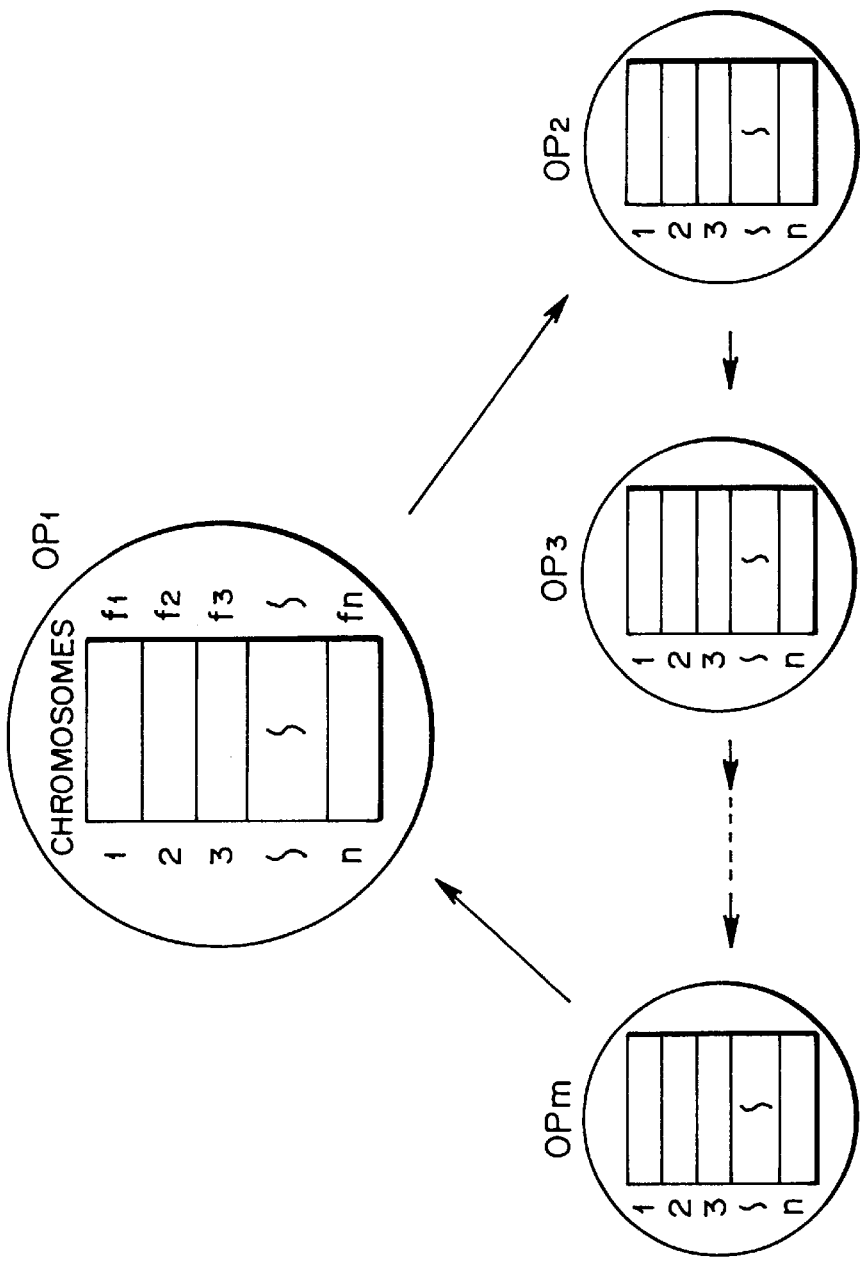
FIG. 4 is a diagrammatic view illustrating genetic algorithms.

By the way, in the genetic algorithms, in order to vary a gene arrangement of chromosomes to produce chromosomes which may possibly make an optimal solution to a problem, various genetic operations ($OP_k$) are performed for individual chromosomes as seen in FIG. 4.

The genetic algorithms popularly use three different genetic operations including selection, crossover and mutation.

The selection (reproduction) is an operation of probabilistically determining a group of individuals to live in a next generation in accordance with a distribution of fitness values of a group, and basically acts so that individuals having higher fitness values leave larger numbers of descendants. Consequently, genes (or gene arrangements) which form better individuals are spread in the group. It is to be noted that the selection merely selects individuals from within a group, but does not produce new genes (or gene arrangements), and the crossover or mutation produces new genes on individuals.

The crossover is an operation of recombining chromosomes of two parents to produce chromosomes of a child. If good partial characters of parents can be successfully inherited in combination by a child, then remarkable augmentation in search can be anticipated.

The mutation is an operation of varying genes in a chromosome in a fixed probability to produce a new gene. The mutation in most cases destructs an effective gene arrangement if the mutation probability is set to a high value, but where no mutation is involved, it is generally considered that only chromosomes as possible combinations of genes of chromosomes in an initial stage can be obtained, and also the quality of a solution obtained is subject to some limitation. Therefore, the mutation is effective to maintain the multiplicity of a group (or to improve the solution).

Subsequently, the optimal solution search apparatus 1 according to the present embodiment will be described with reference to FIG. 1. The chromosome production section 2 represents candidates for solution to a problem as chromosomes "j" which are arrangements of genes to produce chromosomes "j".

Meanwhile, the genetic algorithm execution section 3 executes genetic algorithms.

In particular, the genetic algorithm execution section 3 performs genetic operations $OP_k$ for chromosomes "j" produced by the chromosome production section 2 to successively update the generation and searches for an optimal solution to a problem based on fitness values $f_j'$ calculated from gene arrangements of chromosomes "j'", and includes a schedule determination section 10, a chromosome discrimination section 11, a genetic operation execution section 12, a fitness value updating section 13, a fitness value calculation section 14, an optimal solution discrimination section 15 and an updating pre-processing section 19.

Figure 12:
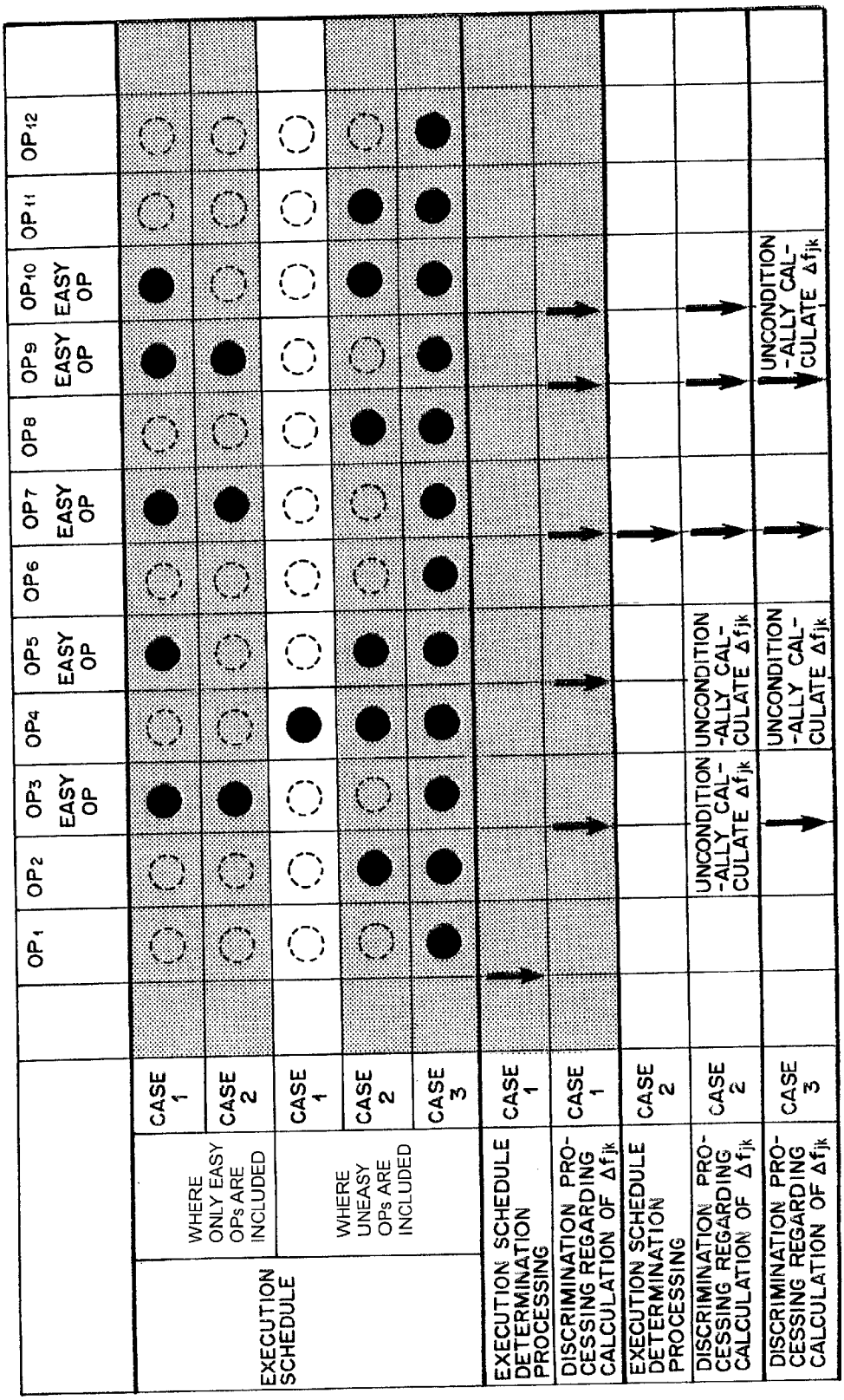

FIGS. 12 to 14 illustrate execution timings of various processes by the genetic algorithm execution section 3. It is to be noted that, in FIGS. 12 to 14, those execution timings adopted popularly are indicated by screen indications.

The schedule determination section 10 determines, for example, at the start of each generation, execution schedules of genetic operations $OP_k$ to be performed for individual chromosomes "j" before the end of the generation in accordance with a probabilistic technique.

In particular, the schedule determination section 10 determines which ones of genetic operations $OP_k$ including crossover, mutation and so forth should be performed for the individual chromosomes "j", and further determines forms in which the genetic operations $OP_k$ are performed (for example, for the crossover, a crossover probability and a crossover type (one-point crossover, two-point crossover or the like), or for the mutation, a mutation probability and a mutation type (exchange of two genes or the like)), and so forth.

The schedule determination section 10 includes an execution schedule storage table 16 into which execution schedules determined are stored.

An example of execution schedules determined by the schedule determination section 10 is shown in FIG. 6. According to the schedules shown in FIG. 6, for the chromosome "1", a genetic operation $OP_1$ is executed, a genetic operation $OP_2$ is not executed, a genetic operation $OP_3$ is executed, ..., and a genetic operation $OP_m$ is executed; for the chromosome "2", the genetic operation $OP_1$ is not executed, the genetic operation $OP_2$ is not executed, the genetic operation $OP_3$ is executed, ..., and the genetic operation $OP_m$ is executed; for the chromosome "n", the genetic operation $OP_1$ is not executed, the genetic operation $OP_2$ is executed, the genetic operation $OP_3$ is not executed, ..., and the genetic operation $OP_m$ is not executed.

It is to be noted that FIGS. 12 to 14 show another example of an execution schedule determined by the schedule determination section 10, wherein genetic operations capable of being performed for the individual chromosomes "j" are genetic operations $OP_1$ to $OP_{12}$ (genetic operations $OP_k$; k=1 to 12).

While, in the present embodiment, as seen in FIG. 6, the schedule determination section 10 determines execution schedules of the genetic operations $OP_k$ for the individual chromosomes "j", it may otherwise determine an execution schedule of the genetic operations $OP_k$ which is common to all of the chromosomes "j".

According to an ordinary optimal solution search apparatus, since contents of each of the genetic operations $OP_k$ to be performed for each of the chromosomes "j" before the end of the generation are determined in accordance with a probabilistic technique every time immediately before the genetic operation $OP_k$ is executed, an execution schedule is not determined in advance.

However, in the optimal solution search apparatus of the present embodiment, if an execution schedule of the genetic operations $OP_k$ is not determined in advance, then processing by the chromosome discrimination section 11 which will be hereinafter described cannot be executed. Therefore, an execution schedule of the genetic operations $OP_k$ is produced by the schedule determination section 10.

It is to be noted that the determination processing for an execution schedule by the schedule determination section 10 may be performed before a particular genetic operation which appears last is executed. The particular gene operation will be hereinafter described.

In the present embodiment, the determination processing for an execution schedule by the schedule determination section 10 will be described by way of an example wherein it is performed at the start of each generation (before the first genetic operation $OP_1$ is executed) (refer to "CASE 1" of "EXECUTION SCHEDULE DETERMINATION PROCESSING" in FIG. 12).

The genetic operation execution section 12 actually performs the genetic operations $OP_k$ for the individual chromosomes "j" in accordance with execution schedules determined by the schedule determination section 10 to produce chromosomes "j" as descendants of the chromosomes "j".

Meanwhile, the chromosome discrimination section 11 refers to execution schedules determined by the schedule determination section 10 to discriminate, for each of the chromosomes "j", whether or not it is a chromosome for which only a particular gene operation by which a fitness value $f_{jk}'$ after execution can be calculated readily making use of a fitness value $f_{jk}$ prior to the execution should be performed.

Here, the particular genetic operation signifies a genetic operation of a type by which a variation amount $\Delta f_{jk}$ of the fitness value by execution of the particular genetic operation can be calculated readily by a difference calculation or the like (including some other calculation processing such as a multiplication calculation). For example, from among the three kinds of genetic operations $OP_k$ (selection, crossover and mutation), the mutation corresponds to this.

It is to be noted that, if a location of a chromosome "j" at which the gene arrangements changes, a manner in which the gene arrangement has changed and so forth become known, then the variation amount $\Delta f_{jk}$ of the fitness value can be calculated by performing a difference calculation or the like taking a relationship of the chromosome "j" to gene arrangements positioned forwardly and rearwardly of the location.

In particular, the particular genetic operation signifies a genetic operation by which, for each chromosome "j", a fitness value $f_{jk}{}'$ after execution of the particular genetic operation can be calculated readily by reflecting a variation amount $\Delta f_{jk}$ of the fitness value by execution of the particular genetic operation upon the fitness value $f_{jk}$ before the execution of the particular genetic operation. It is to be noted that, in the figures of the accompanying drawings, the particular genetic operation is indicated as "EASY OP".

Figure 7:
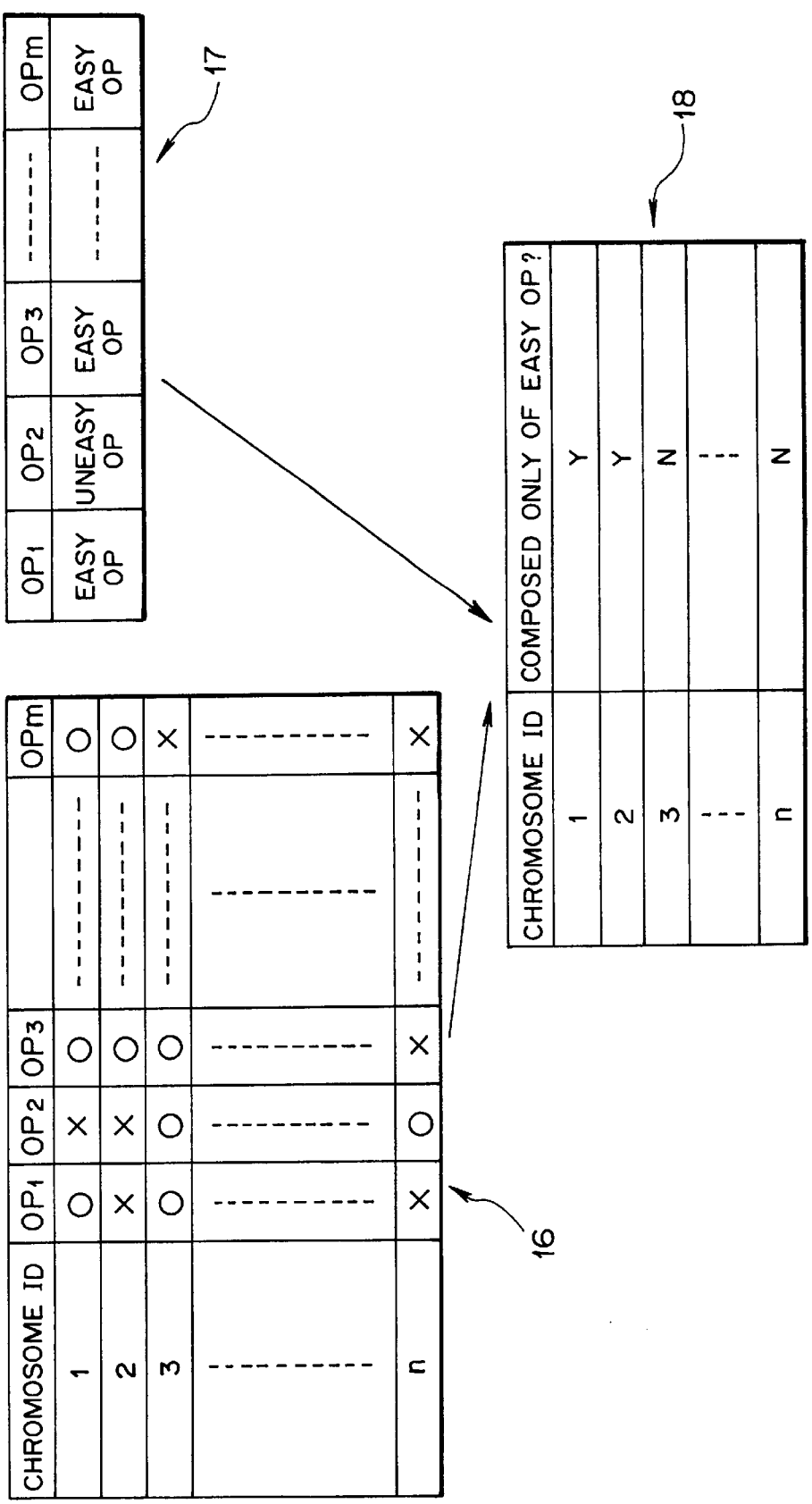
FIG. 7 is a diagrammatic view illustrating the chromosome discrimination processing to be performed by a chromosome discrimination section.

More particularly, the chromosome discrimination section 11 includes an attribute information storage table 17 (refer to FIG. 7) for the genetic operations $OP_k$ and a chromosome discrimination information storage table 18 (refer to FIG. 7). It is to be noted that an example of the attribute information storage table 17 and the chromosome discrimination information storage table 18 is shown in FIG. 7.

The attribute information storage table 17 stores attribute information of the genetic operations $OP_k$ which represents whether or not the genetic operations $OP_k$ which can be performed for the individual chromosomes "j" are the particular genetic operation. The chromosome discrimination information storage table 18 stores chromosome discrimination information which represents whether or not the chromosomes "j" are chromosomes for which only the particular genetic operation should be permitted.

The chromosome discrimination section 11 performs such processing as will be described below to discriminate, each of the chromosomes "j", whether or not it is a chromosome to which only the particular genetic operation should be performed (refer to FIG. 7).

In particular, the chromosome discrimination section 11 first refers to the execution schedule storage table 16 to recognize an execution schedule, for example, for the chromosome "1" and then refers to the attribute information storage table 17 to discriminate whether or not all of the genetic operations $OP_1$, $OP_3$, . . . and $OP_m$ which should be performed for the chromosome "1" are the particular genetic operation (EASY OP).

In this instance, since all of the genetic operations $OP_1$, $OP_3$, . . . and $OP_m$ are the particular genetic operation, Y (Yes) is set into a place of the chromosome discrimination information storage table 18 corresponding to the chromosome "1" in order to indicate that the chromosome "1" is a chromosome for which only the particular genetic operation should be performed.

Then, such processing is performed for all of the chromosomes "j". It is to be noted that, in order to indicate that a chromosome "j" which makes an object of processing is not a chromosome for which only the particular genetic operation should performed, N (No) is set into a place of the chromosome discrimination information storage table 18 which corresponds to the chromosome "j".

In particular, the chromosome discrimination section 11 performs such processing as to refer to the execution schedule storage table 16 and the attribute information storage table 17 of the schedule determination section 10 to produce the chromosome discrimination information storage table 18 as seen in FIG. 7.

It is to be noted that, while, in FIGS. 12 to 14, information of the particular genetic operation (EAST OP) from among the attribute information of the genetic operations $OP_k$ (in FIGS. 12 to 14, k=1 to 12) is described simultaneously in locations for the genetic operations $OP_k$, the attribute information of the genetic operations $OP_k$ is stored in a similar manner as described above in the attribute information storage table 17.

Further, the discrimination processing for a chromosome by the chromosome discrimination section 11 need not be performed simultaneously with the determination processing for an execution schedule by the schedule determination section 10.

In the present embodiment, the discrimination processing for a chromosome by the chromosome discrimination section 11 will be described by way of an example wherein it is performed at the start of each generation (before execution of the first genetic operation $OP_1$) but immediately after the determination processing for an execution schedule by the schedule determination section 10 is completed.

Further, the fitness value updating section 13 updates, for each chromosome "j" which has been discriminated by the chromosome discrimination section 11 to be a chromosome for which only the particular genetic operation should be performed (each chromosome for which Y is placed in the chromosome discrimination information storage table 18 of FIG. 7), the fitness value $f_j$ based on a variation amount $\Delta f_{jk}$ of the fitness value by execution of the particular genetic operation to calculate a fitness value $f_j'$ of the chromosome "J" when the generation comes to an end (a fitness value of a chromosome "j'" which is a descendent of the chromosome "j" ).

In particular, the fitness value updating section 13 performs such processing as described below to calculate a fitness value $f_j'$ at the end of the generation of each chromosome "j" which has been discriminated to be a chromosome for which only the particular genetic operation should be performed.

First, every time the particular genetic operation is executed, the fitness value updating section 13 refers to the chromosome discrimination information storage table 18 (refer to FIG. 7) produced by the chromosome discrimination section 11 to discriminate whether or not a chromosome "j" which makes an object of processing is a chromosome for which only the particular genetic operation should be performed, that is, whether or not a variation amount $\Delta f_{jk}$ of the fitness value of the chromosome "j" which is an object of processing by execution of the particular genetic operation should be calculated (refer to "CASE 1" of "DISCRIMINATION PROCESSING REGARDING CALCULATION OF $\Delta f_{jk}$" in FIG. 12).

Then, when the chromosome "j" which is an object of processing is a chromosome for which only the particular genetic operation should be performed, a variation amount $\Delta f_{jk}$ of the fitness value by execution of the particular genetic operation is calculated after the particular genetic operation is executed, and the fitness value fj is updated based on the calculated variation amount $\Delta f_{jk}$ of the fitness value, whereafter the fitness value updating section 13 waits until the next particular genetic operation is executed (refer to "CASE 1" of "FITNESS VALUE UPDATING PROCESSING" in FIG. 13).

This processing is repeated until execution of the last particular genetic operation is completed to calculate fitness values $f_j'$ at the end of the generation of those chromosomes "j" which have been determined to be chromosomes for which only the particular genetic operation should be performed. It is to be noted that whether or not an genetic operation $OP_k$ executed is the particular genetic operation can be recognized by referring to the attribute information storage table 17 shown in FIG. 7.

The updating pre-processing section 19 calculates, when there is a genetic operation which has been executed prior to a genetic operation determined to be an object of determination by the schedule determination section 10, the variation amount $\Delta f_{jk}$ of the fitness value by execution of the particular genetic operation after the particular genetic operation is executed.

This is because, although it cannot be discriminated before an execution schedule is determined whether or not a chromosome "j" which makes an object of processing when the particular genetic operation is to be executed prior to determination of the execution schedule is a chromosome for which only the particular genetic operation should be performed, if contents of the genetic operation or operations $OP_k$ executed already are referred to after the execution schedule is determined, then it can be discriminated whether or not the chromosome "j" which is an object of processing is a chromosome for which only the particular genetic operation should be performed, and in this instance, if the variation amount $\Delta f_{jk}$ of the fitness value by execution of the particular genetic operation executed already is not known, then the fitness values $f_j'$ of the chromosomes "j" at the end of the generation cannot be calculated.

It is to be noted that, where the determination processing for an execution schedule by the schedule determination section 10 is performed at the start of each generation, the updating pre-processing section 19 does not function since no generic operation has been executed prior to the genetic operation which is made an object of determination by the schedule determination section 10.

In the present embodiment, the determination processing for an execution schedule by the schedule determination section 10 is described by way of an example wherein it is performed at the start of each generation, and another example wherein the updating pre-processing section 19 functions will be hereinafter described (refer to "b. Others").

Meanwhile, the fitness value calculation section 14 calculates, for each chromosome "j" which has been determined by the chromosome discrimination section 11 not to be a chromosome for which only the particular genetic processing should be performed, that is, for each chromosome for which N is set in the chromosome discrimination information storage table 18 of FIG. 7, from the gene arrangement of a chromosome "j'" which is a descendant of the chromosome "j", a fitness value $f_j'$ at the end of the generation of the chromosome "j", that is, a fitness value of the chromosome "j" (refer to "FITNESS VALUE CALCULATION PROCESSING" in FIG. 14).

More particularly, the fitness value calculation section 14 performs such processing as described below to calculate the fitness values $f_j'$ at the end of the generation of those chromosomes "j" which have been determined not to be chromosomes for which only the particular genetic operation should be performed.

First, after execution of all of the genetic operations $OP_k$ is completed, the fitness value calculation section 14 refers to the chromosome discrimination information storage table 18 (refer to FIG. 7) to discriminate whether or not a chromosome "j'" which makes an object of processing is a chromosome for which only the particular genetic operation should be performed, that is, whether or not the chromosome "j'" is a chromosome for which the fitness value $f_j'$ after execution of the genetic operations $OP_k$ has been calculated already by the fitness value updating section 13 described above.

Then, if the chromosome "j'" which is an object of processing is not a chromosome for which only the particular genetic operation should be performed, the fitness value calculation section 14 calculates the fitness value $f_j'$ at the end of the generation of the chromosome "j" from the gene arrangement of the chromosome "j'" similarly as in an ordinary optimal solution search apparatus.

Further, the optimal solution discrimination section 15 discriminates, based on the fitness values $f_j'$ obtained by the fitness value updating section 13 and the fitness value calculation section 14 described above, whether or not any of the chromosomes "j'" obtained as a result of the performance of all of the genetic operations $OP_k$ to be performed has reached an allowable solution which is regarded as an optimal solution (including a solution which seems to be an optimal solution), or in other words, whether or not the genetic algorithms by the genetic algorithm execution section 3 should be ended.

Then, if the optimal solution discrimination section 15 discriminates that any of the chromosomes "j'" has reached an allowable solution which is regarded as an optimal solution or the genetic algorithms should be ended, it outputs one of the chromosomes "j'" which has the highest fitness value $f_j'$ as an optimal solution. However, if the optimal solution discrimination section 15 discriminates that none of the chromosomes "j'" has reached an allowable solution which is regarded as an optimal solution or the genetic algorithms should not be ended, it updates the generation and activates the schedule determination section 10 again.

It is to be noted that, for example, the following methods (1) to (3) are available as a method of discriminating whether or not the genetic algorithms should be ended.

(1) It is discriminated whether or not the highest fitness value $f_j'$ of chromosomes obtained from each generation has reached a desired value set in advance (including a fitness value corresponding to an allowable solution which is regarded as an optimal solution).

(2) For example, the increasing rate of the highest fitness value $f_j'$ of chromosomes when the generation is updated is referred to to discriminate whether or not the increasing rate has reduced to a value equal to or lower than a predetermined value.

(3) The number of generations for which the genetic algorithms should be performed is determined in advance, and it is discriminated whether or not execution for the number of generations has been completed.

The functions of the chromosome production section 2 and the genetic algorithm execution section 3, that is, the schedule determination section 10, chromosome discrimination section 11, genetic operation execution section 12, fitness value updating section 13, fitness value calculation section 14 and optimal solution discrimination section 15, described above are actually realized as operations of a CPU (central processing unit, computer) which executes an optimal solution search program stored in and read out from a storage medium such as a hard disk, an optical disk or a CD-ROM (compact disk read only memory) and stored in a memory such as a read only memory (RAM).

Here, the optimal solution search program in the present embodiment causes the CPU to function as chromosome production means (to which the chromosome production section 2 corresponds) which represents candidates for solution to a problem as chromosomes "j" which are arrangements of genes, schedule determination means (to which the schedule determination section 10 corresponds) which determines, before those genetic operations $OP_k$ which remain by the end of the generation are executed, execution schedules of the genetic operations $OP_k$ to be performed for the individual chromosomes "j", chromosome discrimination means (to which the chromosome discrimination section 11 corresponds) which refers to the execution schedules determined by the schedule determination means to discriminate, for each of the chromosomes "j", whether or not it is a particular chromosome for which such a particular genetic operation that can calculate a fitness value $f_{jk}'$ after execution readily making use of the fitness value $f_{jk}$ before the execution, fitness value updating means (to which the fitness value updating section 13 corresponds) which updates, for each chromosome "j" which has been discriminated to be such a particular chromosome as mentioned above by the chromosome discrimination means, the fitness value $f_j$ based on variation information $\Delta f_{jk}$ of the fitness value by execution of the particular genetic operation to obtain a fitness value $f_j'$, genetic operation execution means (to which the genetic operation execution section 12 corresponds) which performs the genetic operations $OP_k$ for the individual chromosomes "j", fitness value calculation means (to which the fitness value calculation section 14 corresponds) which calculates, for each chromosome "j" which has not been discriminated to be such a particular chromosome as described above by the chromosome discrimination means, the fitness value $f_j'$ from the gene arrangement of the chromosome "j"', and optimal solution discrimination means (to which the optimal solution discrimination section 15 corresponds) which discriminates an allowable solution which is regarded as an optimal solution to the problem based on the fitness values $f_j'$ obtained by the fitness value updating means and the fitness value calculation means.

Figure 2:
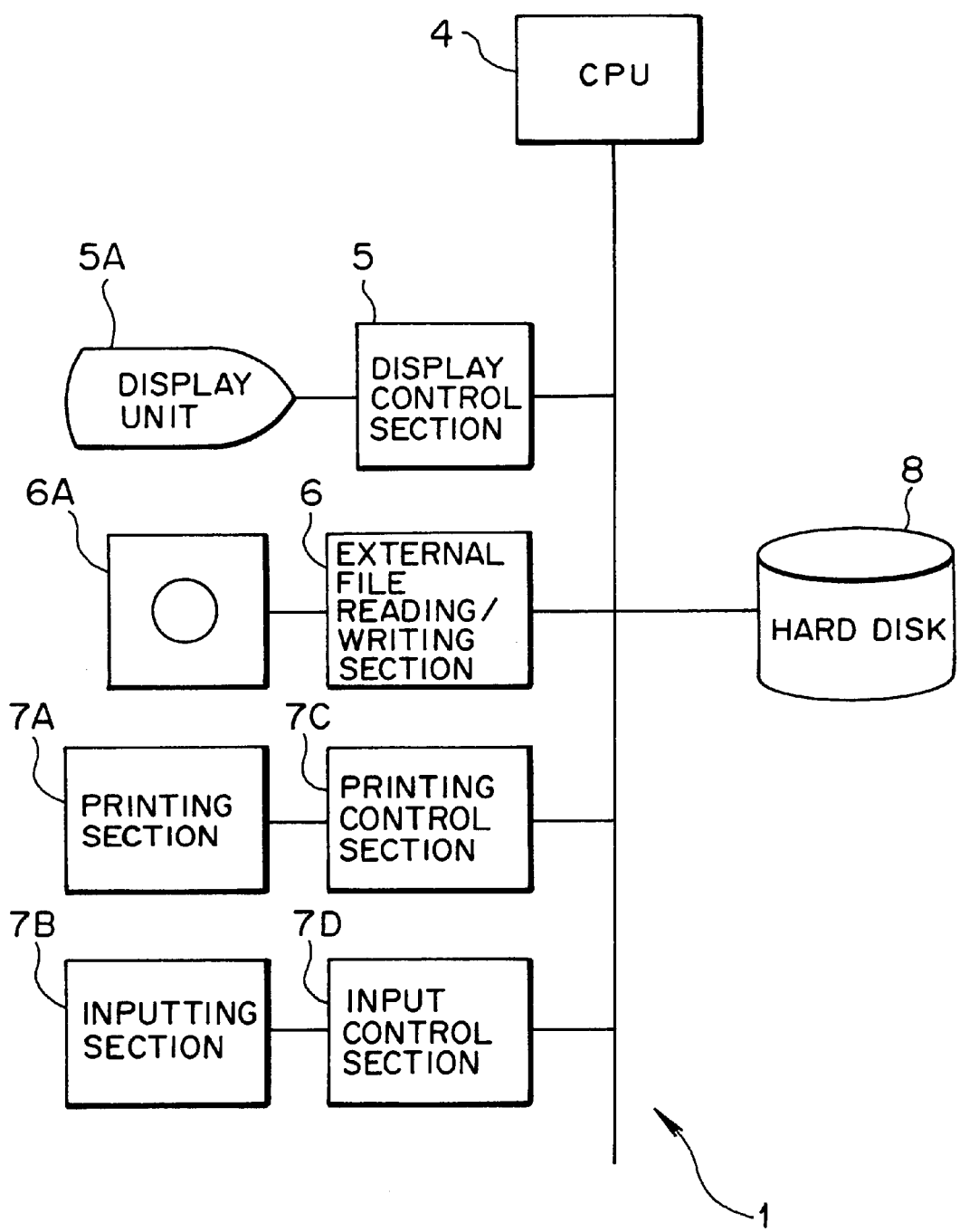
FIG. 2 is a block diagram showing a detailed construction of the optimal solution search apparatus.
Figure 3:
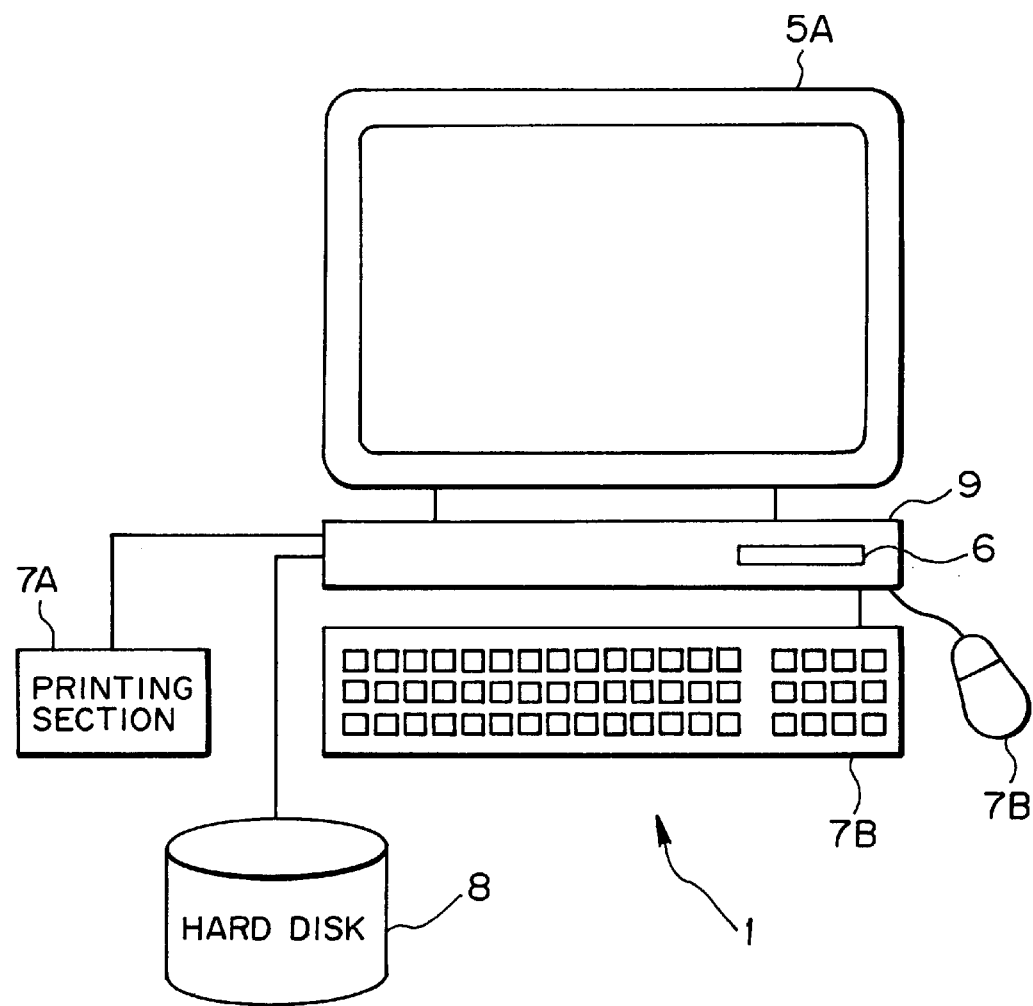
FIG. 3 is a schematic view showing a general construction of the optimal solution search apparatus of FIG. 1.

A detailed construction of the optimal solution search apparatus 1 according to the present embodiment is shown in FIGS. 2 and 3.

Referring to FIG. 2, the optimal solution search apparatus 1 shown includes a display unit 5A for displaying various setting screens, a result of search for an optimal solution and so forth, a display control section 5 for controlling the display condition of the display unit 5A, an inputting section 7B such as a keyboard or a mouse operable by an operator who refers to data displayed on the display unit 5A for inputting response information to the displayed data, and an input control section 7D for controlling the inputting section 7B.

The optimal solution search apparatus 1 further includes a hard disk 8 which stores information such as an operating system (OS) for controlling operation of the optimal solution search apparatus 1 and stores the optimal solution search program in the present embodiment.

The optimal solution search apparatus 1 further includes an external file reading/writing section 6, an external file 6A, a printing section 7A and a printing control section 7C. The external file reading/writing section 6 or the printing section 7A records a result of search for an optimal solution or the like displayed on the display unit 5A into the external file 6A or on predetermined printing paper in response to an instruction from the inputting section 7B.

The optimal solution search apparatus 1 further includes a CPU 4 for collectively controlling the various components of the optimal solution search apparatus 1.

In particular, the optimal solution search apparatus 1 in the present embodiment can be realized using an ordinary computer system (computer; refer to FIG. 3) which includes the CPU 4, display unit 5A, display control section 5, external file reading/writing section 6, printing section 7A, printing control section 7C, inputting section 7B, input control section 7D, hard disk 8 and so forth described above. It is to be noted that reference numeral 9 in FIG. 3 denotes a computer main frame.

In the optimal solution search apparatus 1 of embodiment of the present invention having the construction described above, the chromosome production section 2 first represents candidates for solution to a problem as chromosomes which are arrangements of genes to produce chromosomes "j".

Then, the genetic algorithm execution section 3 successively performs genetic operations $OP_k$ for the chromosomes "j" produced by the chromosome production section 2 to successively update the generation to search for an optimal solution to the problem based on fitness values $f_j'$ calculated from gene arrangements of chromosomes "j"'.

Figure 8:
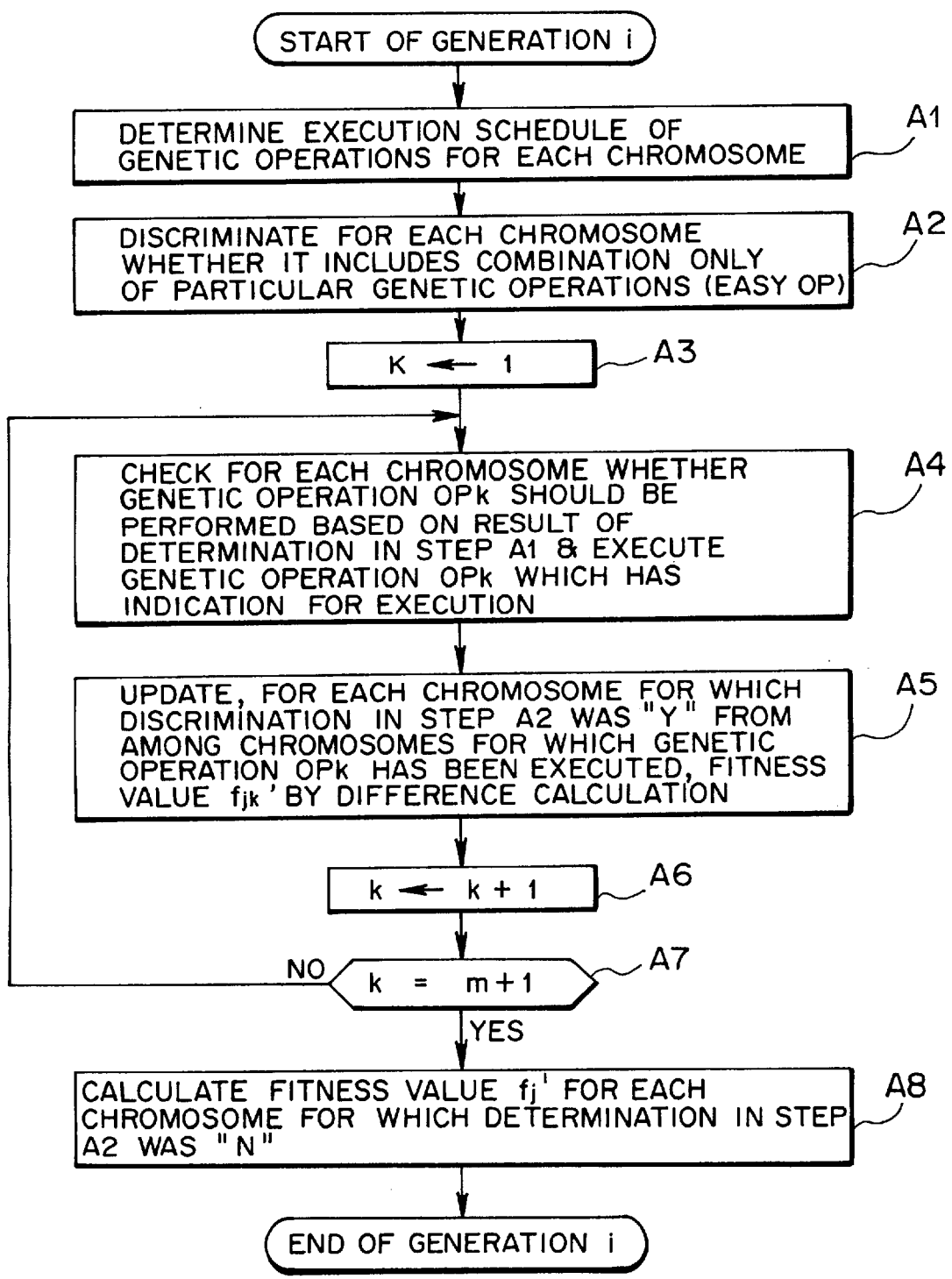
FIG. 8 is a flow chart illustrating operation of the optimal solution search apparatus of FIG. 1.

Here, the processing by the genetic algorithm execution section 3 will be described with reference to the flow chart shown in FIG. 8.

In the genetic algorithm execution section 3, after the generation i (i is an arbitrary natural number) is started, the schedule determination section 10 determines execution schedules of the genetic operations $OP_k$ to be performed for the individual chromosomes "j" (j=1 to n) in accordance with a probabilistic technique (step A1).

Then, the chromosome discrimination section 11 refers to the execution schedule storage table 16 and the attribute information storage table 17 illustrated in FIG. 7 to discriminate whether or not those genetic operations to be performed for each of the chromosomes "j" are a combination only of particular genetic operations (EASY OP), that is, whether or not each of the chromosomes "j" is a chromosome for which only the particular genetic operation should be performed, and produces the chromosome discrimination information storage table 18 (step A2).

In this manner, after the determination processing for an execution schedule by the schedule determination section 10 (step A1) and the discrimination processing for a chromosome by the chromosome discrimination section 11 (step A2) are completed, the genetic operations $OP_k$ are executed by the genetic operation execution section 12.

In particular, the genetic operation execution section 12 sets the variable "k" to "1" to select the genetic operation $OP_1$ from among the genetic operations $OP_k$ (step A3). Then, the genetic operation execution section 12 checks it based on the execution schedules determined by the schedule determination section 10 whether or not the genetic operation $OP_1$ should be performed for each of the chromosomes "j", and executes the genetic operation $OP_1$ for each of those chromosomes "j" for which it is indicated that the genetic operation $OP_1$ should be performed (step A4).

Further, the fitness value updating section 13 recognizes, based on the attribute information storage table 17 shown in FIG. 7, that the genetic operation $OP_1$ executed is the particular genetic operation. Then, for each of those chromosomes "j" for which Y has been set in the chromosome discrimination information storage table 18 of FIG. 7, that is, for each of those chromosomes to which only the particular genetic operation should be performed, from among the chromosomes "j" for which the genetic operation $OP_1$ has been performed, the fitness value updating section 13 updates the fitness value $f_{j1}$ (whose initial value is a fitness value $f_j$ at the start of the generation i) based on a variation amount $\Delta f_{j1}$ of the fitness value by execution of the genetic operation $OP_1$ (step A5).

In particular, for a chromosome "j", where the fitness value prior to execution of a genetic operation $OP_k$ as the particular genetic operation is represented by $f_{jk}$, the fitness value after execution of the genetic operation $OP_k$ is represented by $f_{jk}'$, and the variation amount of the fitness value by the genetic operation $OP_k$ is represented by $\Delta f_{jk}$, the fitness value $f_{jk}'$ after execution of the genetic operation $OP_k$ is calculated (updated) in accordance with the following expression for calculation:

$$f_{jk}' = f_{jk} + \Delta f_{jk}$$

Then, at a point of time at which the execution of all of the genetic operations $OP_k$ is completed, a fitness value $f_j'$ of the generation i after execution is calculated.

Further, the genetic operation execution section 12 increments the value of the variable "k" by one (step A6) and discriminates whether or not the value of the variable "k" is "m+1", that is, whether or not execution of the last genetic operation $OP_m$ has been completed (step A7; refer to "DISCRIMINATION PROCESSING OF COMPLETION OF EXECUTION OF ALL OP OF GENERATION i" in FIG. 14).

In this instance, since execution only of the genetic operation $OP_1$ has been completed, the processing in steps A4 to A7 described above is executed again until execution of the last genetic operation $OP_m$ is completed (from the NO route of step A7 to step A4).

On the other hand, if execution of the last genetic operation $OP_m$ is completed and it is discriminated in step A7 that the value of the variable "k" is "m+1", then the fitness value calculation section 14 calculates, for each of the chromosomes "j" for which N is set in the chromosome discrimination information storage table 18 of FIG. 7, that is, for each chromosome for which not only the particular genetic operation should be performed, a fitness value $f_j'$ at the end of the generation from the gene arrangement of a chromosome "j'" which is a descendent of the chromosome "j" (step A8).

It is to be noted that, in the genetic algorithm execution section 3, the optimal solution discrimination section 15 discriminates, based on the fitness values $f_j'$ obtained by the fitness value updating section 13 and the fitness value calculation section 14, whether or not a chromosome which corresponds to an optimal solution to the problem is included in the chromosomes "j" obtained as a result of the performance of all of the genetic operations $OP_k$ to be performed, that is, whether or not any of the chromosomes "j'" produced has reached an allowable solution which is regarded as an optimal solution. Then, if it is discriminated that a chromosome corresponding to an optimal solution to the problem is not included, then the genetic algorithm execution section 3 updates the generation and repeats the processing in steps A1 to A8 described above. Then, if it is discriminated that a chromosome corresponding to an optimal solution is included, then the genetic algorithm execution section 3 outputs the chromosome "j'" as an optimal solution.

Figure 9:
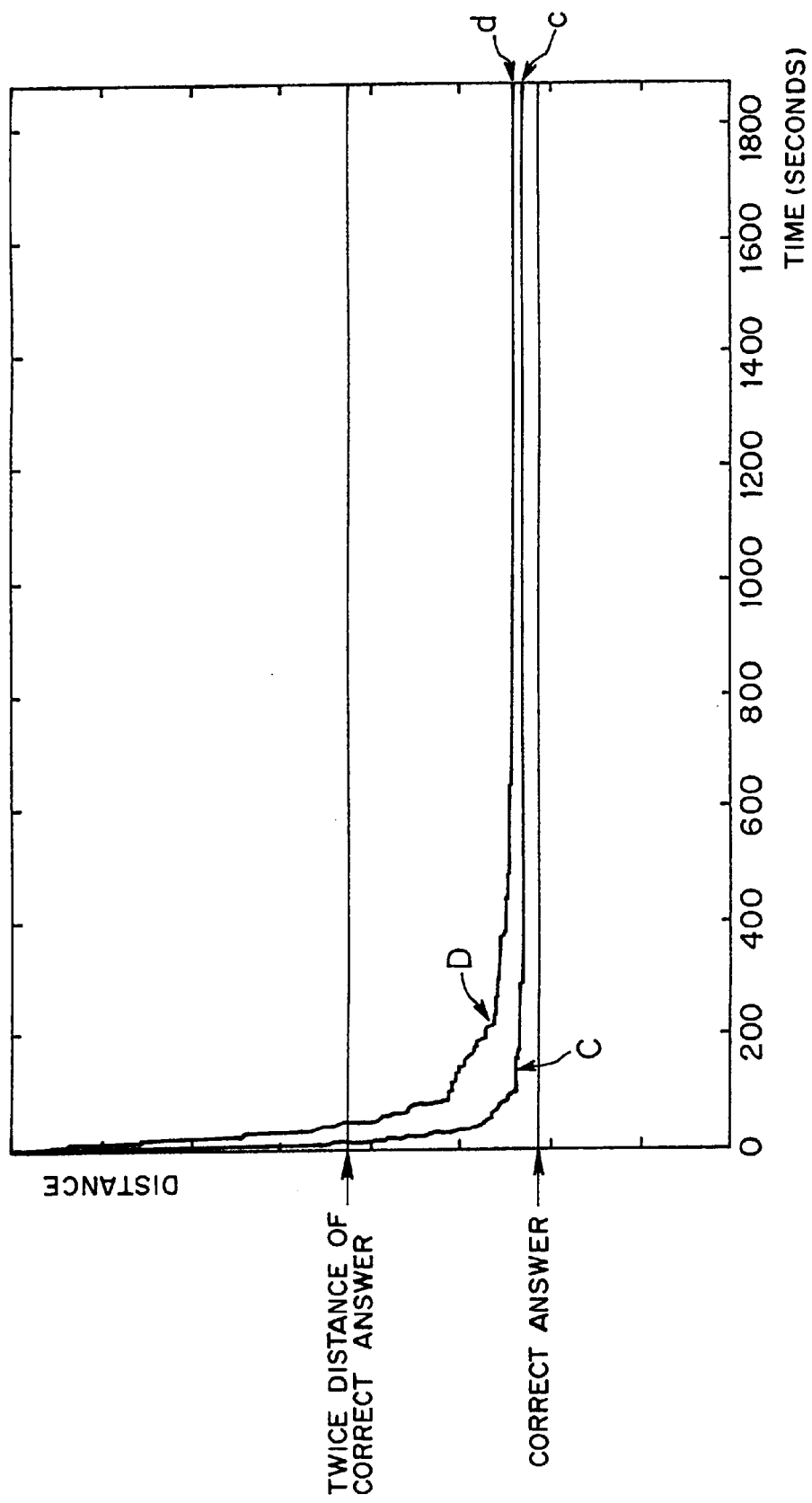
FIGS. 9, 10 and 11 are diagrammatic views showing different an example of a result of a search for an optimal solution by the optimal solution search apparatus of FIG.
Figure 10:
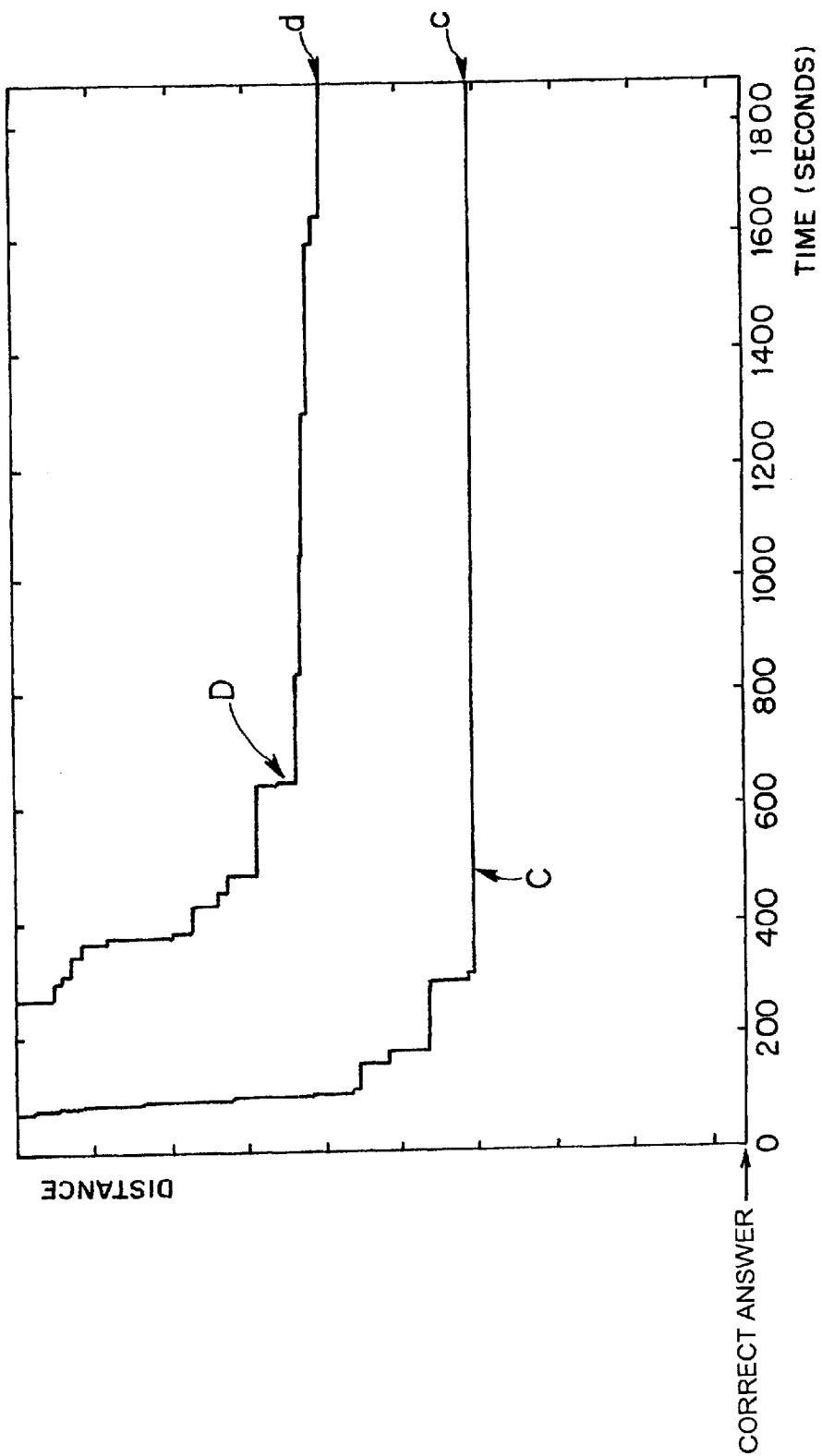
Figure 11:
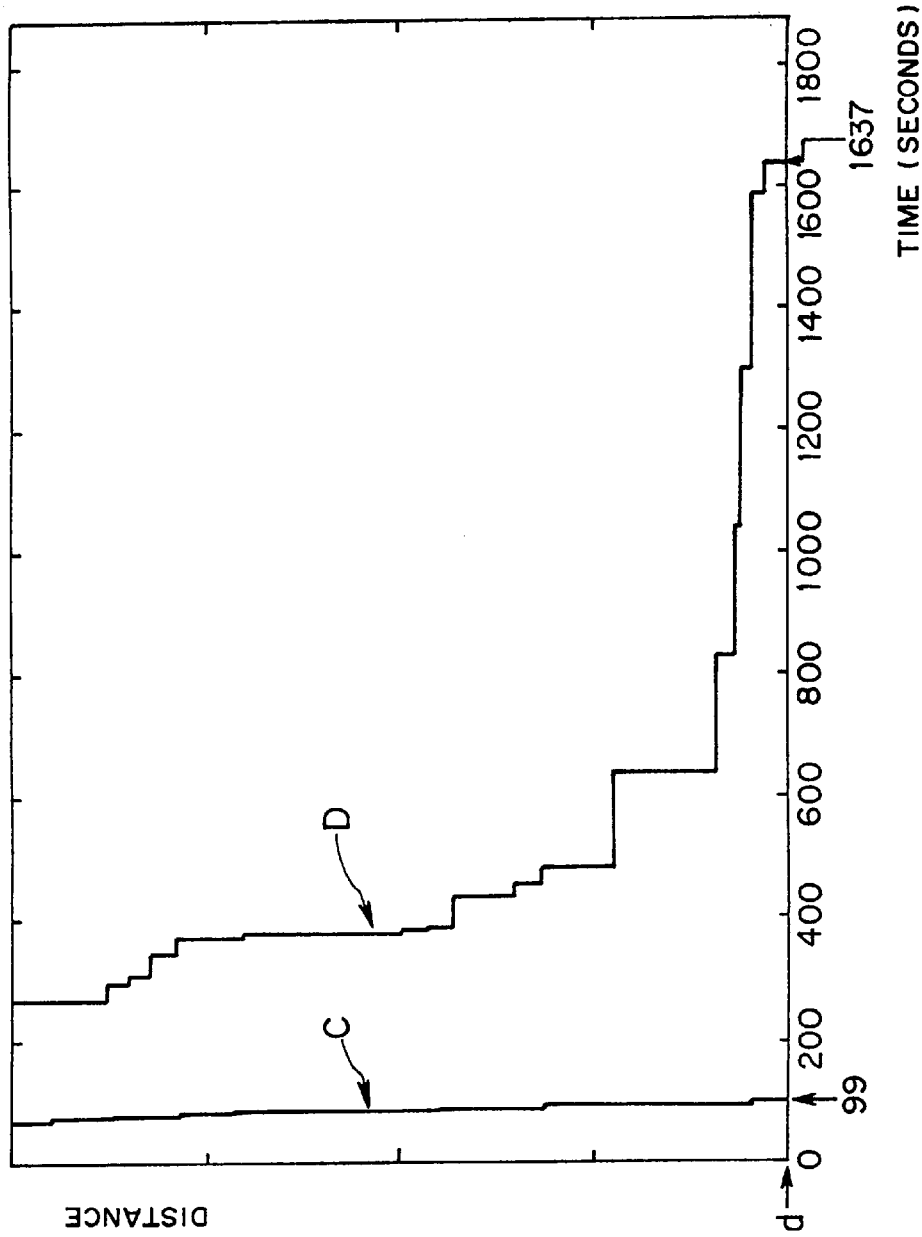

Here, an example of a result when an optimal solution is searched for actually by the optimal solution search apparatus 1 according to the present embodiment is illustrated in FIGS. 9 to 11.

FIGS. 9 to 11 illustrates a result of solution to a traveling salesman (salesperson) problem by the optimal solution search apparatus 1. It is to be noted that the traveling salesperson problem signifies a problem of finding out the shortest route (a route of the shortest distance) when a sales person visits all of several predetermined towns (in FIGS. 9 to 11, 100 towns) each by one time.

FIG. 9 is a diagram obtained by plotting a distance corresponding to a solution (route) calculated from a chromosome having the highest fitness value in each generation with respect to time. Meanwhile, FIGS. 10 and 11 are diagrams both showing part of the diagram of FIG. 9 enlarged in the direction of the axis of ordinate, and FIG. 10 is a diagram when the lower limit value of the axis of ordinate is determined as a correct answer to the problem while FIG. 11 is a diagram when the lower limit value of the axis of ordinate is determined as d (allowable solution reached in the process of search for an optimal solution) indicated in FIG. 9.

In FIGS. 9 to 11, each curve C indicates a result when it is attempted to search for an optimal solution using the optimal solution search method according to the present embodiment, and each curve D indicates another result when it is attempted to search for an optimal solution using an ordinary method. It is to be noted that the optimal solution search method corresponding to the curve C uses a certain non-particular genetic operation from among genetic operations used in the optimal solution search method corresponding to the curve D while lowering the frequency of execution of the non-particular genetic operation.

It can be seen from FIGS. 9 to 11 that the optimal solution search method according to the present embodiment provides a higher processing speed than the ordinary method.

It is to be noted that, more strictly, it may be considered otherwise that there is the possibility that, with the optimal solution search method according to the present embodiment corresponding to the curve C, since the execution frequency of some genetic operation is reduced, for example, the other genetic operations exhibit higher contributions to an increase in fitness value than the genetic operation whose execution frequency has been decreased and the influence of such contribution contributes much to a difference in performance as a whole while the contribution of the functions based on the optimal solution search method according to the present embodiment is low. However, it has been observed by an actual measurement that the contribution of the functions based on the optimal solution search method according to the present embodiment is sufficiently high.

As described above, with the optimal solution search apparatus 1 according to the embodiment of the present invention, the time required for calculation processing of fitness values can be reduced by determining execution schedules of genetic operations $OP_k$ to be performed for individual chromosomes "j", discriminating those chromosomes "j" for which only a particular genetic operation of such a form with which a variation amount $\Delta f_{jk}$ of the fitness value can be calculated readily by a difference calculation or the like in accordance with the execution schedules and successively updating, for each of those chromosomes "j", the fitness value $f_j$ at the start of each generation after execution of the particular genetic operation. Consequently, the genetic algorithms can be executed at a high speed, and an optimal solution to the problem can be searched at a high speed.

Further, with the optimal solution search apparatus 1 according to the present embodiment, the effect described above is particularly high where the number of chromosomes which make an object of processing increases or when the length of a chromosome which makes an object of processing increases or otherwise when the calculation processing for fitness values is complicated, that is, where an evaluation function is complicated.

It is to be noted that the optimal solution search apparatus 1 according to the present embodiment can be utilized to solve various optimization problems, that is, for optimization of a delivery route where a truck is used, optimization of an operation schedule of a factory, optimization of a diagram of a traffic facility, optimization of a working schedule of a nurse or the like and so forth.

b. Others

While the foregoing description is given by way of an example wherein the schedule determination section 10 performs the determination processing for an execution schedule at the start of each generation (prior to execution of the first genetic operation $OP_1$), only it is required that the determination processing for an execution schedule be performed before the particular genetic operation which appears last is executed as described hereinabove.

Figure 5:
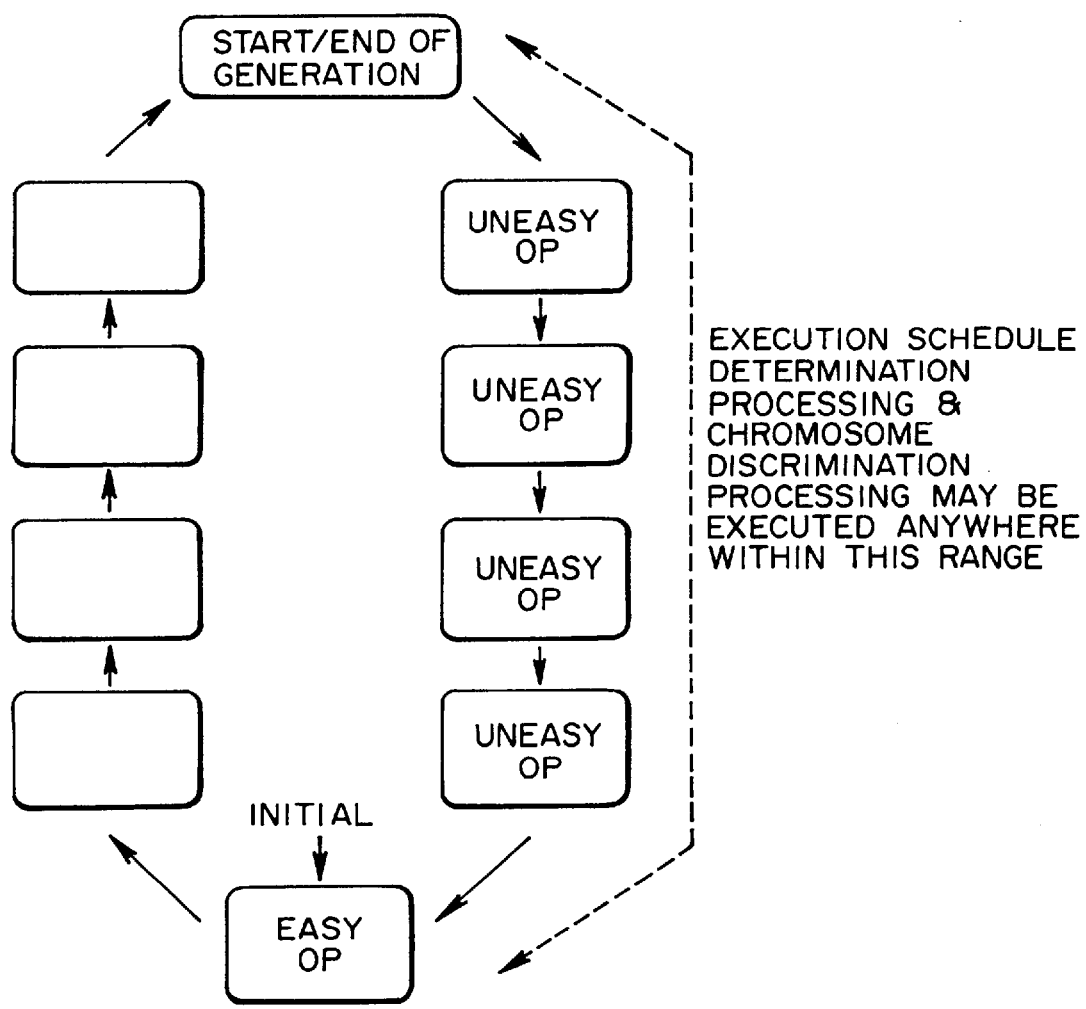
FIG. 5 is a diagrammatic view illustrating execution timings of execution schedule determination processing and chromosome discrimination processing.

In particular, the schedule determination section 10 may perform the determination processing for an execution schedule before the particular genetic operation which appears first is performed (refer to FIG. 5) or before an arbitrary one of genetic operations $OP_k$ is executed (refer to "CASE 2" of "EXECUTION SCHEDULE DETERMINATION PROCESSING" in FIG. 12).

When the schedule determination section 10 performs the determination processing for an execution schedule other than at the start of each generation in this manner, there is a genetic operation $OP_k$ which has been executed already, that is, there is a genetic operation which has been executed prior to a genetic operation which is determined as an object of determination by the schedule determination section 10.

Further, whether or not each of those genetic operations $OP_k$ should be executed is determined for each chromosome "j" using a probabilistic technique at the point of time of the execution.

Therefore, the chromosome discrimination section 11 must refer not only to execution schedules determined by the schedule determination section 10, but also to an execution condition of the genetic operation $OP_k$ which has been executed already, such as whether or not all of the executed genetic operations $OP_k$ are the particular genetic operation (EASY OP) or the like, to discriminate for each of the chromosomes "j" whether or not it is a chromosome for which only the particular genetic operation should be performed.

Further, only it is required that the determination processing for a chromosome by the chromosome discrimination section 11 be performed before the particular genetic operation which appears last is executed only if the determination processing for an execution schedule by the schedule determination section 10 has been completed.

In particular, only if the determination processing for an execution schedule by the schedule determination section 10 has been completed, the chromosome discrimination section 11 may perform, for each of the chromosomes "j", the determination processing for a chromosome before the particular genetic operation which appears first is executed (refer to FIG. 5) or after an arbitrary genetic operation is executed before the particular genetic operation which appears last is executed.

It is to be noted that, only if the determination processing for an execution schedule by the schedule determination section 10 has been completed, the chromosome discrimination section 11 may perform the determination processing for a chromosome for each of the chromosomes "j" before updating of the fitness value by the fitness value updating section 13 after execution of the last genetic operation $OP_m$.

Further, where the schedule determination section 10 performs the determination processing for an execution schedule other than at the start of each generation as described above, upon execution of the particular genetic operation from among genetic operations $OP_k$ which have been executed already, the variation amount $\Delta f_{jk}$ of the fitness value by execution of the particular genetic operation must be calculated unconditionally (refer to the "CASE 2" of "DISCRIMINATION PROCESSING REGARDING CALCULATION OF $\Delta f_{jk}$" in FIG. 12).

It is to be noted that the variation amount $\Delta f_{jk}$ of the fitness value calculated here is used for updating of the fitness value $f_j$.

Further, while the calculation of the variation amount $\Delta f_{jk}$ of the fitness value in this instance is performed by the updating pre-processing section 19 as described hereinabove, the fitness value updating section 13 may otherwise have the function as the updating pre-processing section 19.

Furthermore, the fitness value updating section 13 may calculate, upon execution of the particular genetic operation from among genetic operations $OP_k$ which make an object of determination for a schedule by the schedule determination section 10, the variation amount $\Delta f_{jk}$ of the fitness value by execution of the particular genetic operation independently of a result of the determination by the chromosome discrimination section 11 (refer to "CASE 3" of "DISCRIMINATION PROCESSING REGARDING CALCULATION OF $\Delta f_{jk}$" in FIG. 12).

It is to be noted that the fitness value updating section 13 may otherwise calculate, after execution of an arbitrary one of genetic operations $OP_k$ which make an object of determination for a schedule by the schedule determination section 10, the variation amount $\Delta f_{jk}$ of the fitness value by execution of the particular genetic operation.

On the other hand, while, in the embodiment described above, the fitness value updating section 13 updates the fitness values $f_j$ based on the variation amounts $\Delta f_{jk}$ of the fitness values calculated every time upon execution of the particular genetic operation (refer to "CASE 1" of "FITNESS VALUE UPDATING PROCESSING" in FIG. 13), only the variation amounts $\Delta f_{jk}$ of the fitness values may alternatively be calculated upon execution of the particular genetic operation whereas updating of the fitness values $f_j$ is performed collectively at the end of each generation, or otherwise, calculation of the variation amounts $\Delta f_{jk}$ of the fitness values and updating of the fitness values $f_j$ may be performed collectively at the end of each generation (for both, refer to "CASE 2" of "FITNESS VALUE UPDATING PROCESSING" in FIG. 13).

Further, where the fitness value updating section 13 cannot execute a certain particular genetic operation unless the fitness value immediately prior to that point of time is known, final updating of the fitness values $f_j$ may be performed based on the fitness values $f_j$ which are updated once before execution of the directly preceding particular genetic operation is completed (refer to "CASE 3" of "FITNESS VALUE UPDATING PROCESSING" in FIG. 13).

In the embodiment described above, the fitness value updating section 13 updates the fitness value $f_j$ every time when a chromosome "j" which makes an object of processing upon execution of the particular genetic operation is a chromosome for which only the particular genetic operation should be performed, the updating manner of the fitness value updating section 13 is not limited to this, and the fitness value updating section 13 may calculate, even when a chromosome "j" which-makes an object of processing is not a chromosome to which only the particular genetic operation should be performed, the variation amount $\Delta f_{jk}$ of the fitness value every time and check the validity of a fitness value $f_j'$ calculated using the variation amount $\Delta f_{jk}$ of the fitness value at the end of the generation.

It is to be noted that the checking of the validity of the fitness value $f_j'$ then may be performed at the end of the generation, that is, after execution of all of the genetic operations $OP_k$ is completed, referring to a result of confirmation of execution conditions of the genetic operations $OP_k$.

Further, depending upon a manner in which a genetic operation $OP_k$ is performed, even if the genetic operations $OP_k$ is performed, the gene arrangement may possibly exhibit no variation by chance.

One of examples of this may be a case wherein the position at which a chromosome is to be cut for crossover is any of the opposite ends of the chromosome. In this instance, even if crossover is performed, the gene arrangement of the chromosome of the child does not exhibit a variation from the gene arrangement of the parent.

Thus, upon determination of execution schedules of genetic operations $OP_k$, also the position at which a chromosome should be cut for crossover may be determined so that, when the cutting position of a chromosome comes to any of the opposite ends of the chromosome, the genetic operation (crossover) may not be executed regarding the genetic operation (crossover) as a particular genetic operation so as to be reflected on the execution schedule.

Another example of a case wherein the gene arrangement exhibits no variation by chance even if a genetic operation $OP_k$ is performed may be a case wherein crossover does not occur depending upon setting of the crossover probability for crossover. For example, where the crossover probability is 50%, crossover is performed only by a frequency of once for two times.

Or, if crossover is not performed actually although crossover should be performed depending upon an execution schedule, a fitness value may be passed as it is.

It is to be noted that, while the schedule determination section 10 in the optimal solution search apparatus 1 according to the embodiment described above determines execution schedules of genetic operations $OP_k$ for each generation, the schedule determination section 10 may alternatively determine execution schedules of genetic operations $OP_k$ for a plurality of generations collectively or may otherwise perform determination processing for an execution schedule by a plurality of times for each generation.

Further, while the optimal solution search apparatus 1 according to the embodiment described above performs only genetic operations for individual chromosomes to update the chromosomes "j", an engineering operation such as, for example, a hill-climbing method may be performed in addition to the genetic operations to update the chromosomes "j".

What is claimed is:

1. A method of searching for an optimal solution to an optimization problem using a computer processor to process data, comprising:

representing candidates for the optimal solution of the optimization problem as chromosomes, each chromosome having at least one arrangement of genes;

searching for the optimal solution to the optimization problem by iteratively and successively performing the following operations:

performing at least one of a plurality of genetic operations on each of the chromosomes, calculating a fitness value for each of the chromosomes based on the arrangement of the genes of each of the chromosomes, and updating a generation of the chromosomes based on the calculated fitness values, wherein the genetic operations comprise one or more particular genetic operations, and by performing each particular genetic operation, the fitness value of an associated chromosome varies by a specific amount, and wherein, for each particular genetic operation performed, said calculating a fitness value comprises updating the fitness value based on the specific variation amount of the fitness value without calculating the fitness value using the arrangement of genes of the associated chromosome; and outputting, when a chromosome is determined to be an optimal solution chromosome, the optimal solution chromosome as the optimal solution to the optimization problem.

2. A method of searching for an optimal solution to an optimization problem using a computer processor to process data, comprising:

representing candidates for the optimal solution of the optimization problem as chromosomes, each chromosome having at least one arrangement of genes;

searching for the optimal solution to the optimization problem by iteratively and successively performing the following operations:

determining an execution schedule of at least one of a plurality of genetic operations to be performed on each of the chromosomes in a current generation of the chromosomes, the genetic operations comprising one or more particular genetic operations, and by performing each particular genetic operation, the fitness value of an associated chromosome varies by a specific amount, discriminating, for each chromosome in the current generation, whether each chromosome is a particular chromosome on which only one of the particular genetic operations is to be performed, by referring to the execution schedule determined for the current generation, performing at least one of the genetic operations on each chromosome in the current generation in accordance with the execution schedules for the current generation, calculating a fitness value for each chromosome based on the arrangement of genes of each chromosome, and updating a generation of the chromosomes based on the calculated fitness values, wherein, for each particular genetic operation performed, said calculating a fitness value comprises updating the fitness value based on the specific variation amount of the fitness value without calculating the fitness value using the arrangement of genes of the particular chromosome; and outputting, when a chromosome is determined to be an optimal solution chromosome, the optimal solution chromosome as the optimal solution to the optimization problem.

3. The method of claim 2, wherein said updating updates the fitness values in synchronism with execution of the particular genetic operation.

4. The method of claim 3, wherein upon execution of the particular genetic operation, said updating calculates variation information of the fitness value by execution of the particular genetic operation.

5. The method of claim 2, wherein upon execution of the particular genetic operation, said updating calculates variation information of the fitness value by execution of the particular genetic operation.

6. The method of claim 2, wherein said updating calculates variation information of the fitness value by execution of the particular genetic operation after execution of an arbitrary one of the genetic operations which make an object of determination in the schedule determination step.

7. The method of claim 2, wherein upon execution of the particular genetic operation from among the genetic operations executed prior to the genetic operations which have been determined as an object of determination, variation information of the fitness value by execution of the particular genetic operation is calculated.

8. The method of claim 2, wherein said schedule determining determines the execution schedule before the particular genetic operation which appears last is executed.

9. The method of claim 8, wherein said schedule determining determines the execution schedule before the first genetic operation is executed.

10. The method of claim 8, wherein said schedule determining determines the execution schedule before the particular genetic operation which appears first is executed.

11. The method of claim 2, wherein said schedule determining determines the execution schedule before an arbitrary genetic operation is executed.

12. The method of claim 2, wherein said schedule determining determines the execution schedule of genetic operations for the individual chromosomes.

13. The method of claim 2, wherein said schedule determining determines an execution schedule of genetic operations which is common to all of the chromosomes.

14. The method of claim 2, wherein said chromosome discriminating refers to the execution schedule and also to execution conditions of the genetic operations which have been executed prior to a genetic operation determined as an object of determination to discriminate, for each of the chromosomes, whether the chromosome is a chromosome for which only the particular genetic operation should be performed.

15. The method of claim 2, wherein said chromosome discriminating discriminates, for each of the chromosomes, whether the chromosome is a chromosome for which the particular genetic operation should be performed before the particular genetic operation which appears last is executed.

16. The method of claim 15, wherein said chromosome discriminating discriminates, for each of the chromosomes, whether the chromosome is a chromosome for which the particular genetic operation should be performed before the first genetic operation is executed.

17. The method of claim 15, wherein said chromosome discriminating discriminates, for each of the chromosomes, whether the chromosome is a chromosome for which the particular genetic operation should be performed before the particular genetic operation which appears first is executed.

18. The method of claim 15, wherein said chromosome discriminating discriminates, for each of the chromosomes, whether the chromosome is a chromosome for which the particular genetic operation should be performed after an arbitrary genetic operation is executed.

19. The method of claim 2, wherein said chromosome discriminating discriminates, for each of the chromosomes, whether the chromosome is a chromosome for which only the particular genetic operation should be performed before the fitness value is updated after the last genetic operation is executed.

20. The method of claim 1, wherein said updating updates the fitness values in synchronism with execution of the particular genetic operation.

21. The method of claim 20, wherein upon execution of the particular genetic operation, said updating calculates variation information of the fitness value by execution of the particular genetic operation.

22. The method of claim 1, wherein upon execution of the particular genetic operation, said updating calculates variation information of the fitness value by execution of the particular genetic operation.

23. The method of claim 1, wherein said updating is carried out on the fitness value of each of the chromosomes for which only such a particular genetic operation should be performed.

24. A method of searching for an optimal solution to an optimization problem using a computer processor to process data, comprising:

representing candidates for the optimal solution of the optimization problem as chromosomes, each chromosome having at least one arrangement of genes;

searching for the optimal solution to the optimization problem by iteratively and successively performing the following operations:

determining an execution schedule of at least one of a plurality of genetic operations to be performed on each of the chromosomes in a current generation of the chromosomes, the genetic operations comprising one or more particular genetic operations, and by performing each particular genetic operation, the fitness value of an associated chromosome varies by a specific amount, discriminating, for each chromosome in the current generation, whether each chromosome is a particular chromosome on which only one of the particular genetic operations is to be performed, by referring to the execution schedule determined for the current generation, performing at least one of the generic operations on the individual chromosomes in accordance with the execution schedules for the current generation, calculating a fitness value for each of the chromosomes based on the arrangement of genes of each chromosome, and updating a generation of the chromosomes based on the calculated fitness values, wherein, for each particular genetic operation performed, said calculating a fitness value comprises updating the fitness value based on the specific variation amount of the fitness value without calculating the fitness value using the arrangement of genes of the particular chromosome, and wherein, upon performing each of the particular genetic operations, said calculating a fitness value updates the fitness value by calculating the variation amount of the fitness value independently of said discriminating; and outputting, when a chromosome is determined to be an optimal solution chromosome, the optimal solution chromosome as the optimal solution to the optimization problem.

25. A data processing system for searching for an optimal solution to an optimization problem using a computer processor to process data, comprising:

a chromosome generation unit representing candidates for the optimal solution of the optimization problem as chromosomes, each chromosome having at least one arrangement of genes;

a schedule determination unit determining an execution schedule of at least one of a plurality of genetic operations to be performed on each of the chromosomes in each generation of the chromosomes, the genetic operations comprising one or more particular genetic operations, and by performing each particular genetic operation, the fitness value of an associated chromosome varies by a specific amount;

a chromosome discrimination unit discriminating, for each chromosome in each generation, whether each chromosome is a particular chromosome on which only one of the particular genetic operations is to be performed, by referring to the execution schedule determined for each generation;

a genetic operation execution unit performing at least one of the genetic operations on the individual chromosomes in accordance with the execution schedules for each generation;

a fitness value calculation unit calculating a fitness value for each of the chromosomes, except for the particular chromosome, based on the arrangement of genes of each chromosome;

a fitness value updating unit updating the fitness value for each of the particular chromosomes based on the specific variation amount of the fitness value without calculating the fitness value using the arrangement of genes of each particular chromosomes;

a generation updating unit updating a generation of the chromosomes based on both the fitness values calculated by said fitness value calculation unit and the fitness values updated by said fitness value updating unit; and outputting, when a chromosome is determined to be an optimal solution chromosome, the optimal solution chromosome as the optimal solution to the optimization problem.

26. The system of claim 25, wherein said schedule determination unit includes a table storing the execution schedule.

27. The system of claim 25, wherein said chromosome discrimination unit includes a table storing information representing whether genetic operations which may be performed for the individual chromosomes are the particular genetic operation, and another table storing information representing whether the individual chromosomes are chromosomes for which only the particular genetic operation should be performed.

28. The system of claim 25, further comprising an updating preprocessing unit calculating variation information of the fitness value by execution of the particular genetic operation, when the particular genetic operation from among the genetic operations are executed prior to a genetic operation determined as an object of determination by said schedule determination unit.

29. The system of claim 25, further comprising a fitness value calculation unit calculating, for each of the chromosomes which have not been discriminated to be the particular chromosome by said chromosome discrimination means, a fitness value from a gene arrangement of the chromosome.

30. The system of claim 25, further comprising a genetic operation execution unit performing the genetic operations for the individual chromosomes.

31. The system of claim 25, further comprising a optimal solution discrimination unit discriminating an optimal solution to the problem based on the fitness value obtained by said fitness value updating unit and said fitness value calculation unit.

32. The system of claim 25, further comprising a chromosome production unit representing candidates for solution to the problem as chromosomes which are arrangements of genes.

33. A recording medium storing a program for searching for an optimal solution to an optimization problem using a computer processor, said program instructing the computer processor to carry out the following operations:

representing candidates for the optimal solution to the optimization problem as chromosomes, each chromosome having at least one arrangement of genes;

determining an execution schedule of at least one of a plurality of genetic operations to be performed on each of the chromosomes in each generation of the chromosomes, the genetic operations comprising one or more particular genetic operations, and by performing each particular genetic operation, the fitness value of an associated chromosome varies by a specific amount;

discriminating, for each chromosome in each generation, whether each chromosome is a particular chromosome on which only one of the particular genetic operations is to be performed, by referring to the execution schedule determined for each generation;

performing at least one of the genetic operations on the individual chromosomes in accordance with the execution schedules for each generation;

calculating a fitness value for each of the chromosomes, except for the particular chromosome, based on the arrangement of genes of each chromosome;

updating the fitness value for each of the particular chromosomes based on the specific variation amount of the fitness value without calculating the fitness value using the arrangement of genes of each particular chromosome;

updating a generation of the chromosomes based on both the fitness values calculated by said fitness value calculation unit and the fitness values updated by said fitness value updating unit; and outputting, when a chromosome is determined to be an optimal solution chromosome, the optimal solution chromosome as the optimal solution to the optimization problem.

* * * * *